United States Patent
Seki et al.

(10) Patent No.: US 9,470,995 B2
(45) Date of Patent: Oct. 18, 2016

(54) COMPOUND HAVING AZO SKELETON AND PIGMENT DISPERSANT, PIGMENT COMPOSITION, PIGMENT DISPERSION, AND TONER CONTAINING THE COMPOUND

(71) Applicant: CANON KABUSHIKI KAISHA, Tokyo (JP)

(72) Inventors: Masanori Seki, Yokohama (JP); Yuki Hasegawa, Yokohama (JP); Waka Hasegawa, Tokyo (JP); Masashi Kawamura, Yokohama (JP); Taiki Watanabe, Akishima (JP); Chiaki Nishiura, Kawasaki (JP); Takayuki Toyoda, Yokohama (JP); Ayano Mashida, Kawasaki (JP); Yasuaki Murai, Kawasaki (JP); Masashi Hirose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/381,192

(22) PCT Filed: Feb. 20, 2013

(86) PCT No.: PCT/JP2013/055028
§ 371 (c)(1),
(2) Date: Aug. 26, 2014

(87) PCT Pub. No.: WO2013/129433
PCT Pub. Date: Sep. 6, 2013

(65) Prior Publication Data
US 2015/0024321 A1   Jan. 22, 2015

(30) Foreign Application Priority Data
Feb. 29, 2012   (JP) ................ 2012-043467

(51) Int. Cl.
| G03G 9/09 | (2006.01) |
| C09B 33/153 | (2006.01) |
| C09B 33/24 | (2006.01) |
| C08F 8/30 | (2006.01) |
| G03G 9/08 | (2006.01) |
| G03G 9/087 | (2006.01) |
| C09B 67/22 | (2006.01) |
| C09B 67/46 | (2006.01) |
| C09D 17/00 | (2006.01) |

(52) U.S. Cl.
CPC ............. *G03G 9/091* (2013.01); *C08F 8/30* (2013.01); *C09B 33/153* (2013.01); *C09B 33/24* (2013.01); *C09B 67/009* (2013.01); *C09B 67/0055* (2013.01); *C09D 17/003* (2013.01); *G03G 9/08* (2013.01); *G03G 9/0806* (2013.01); *G03G 9/087* (2013.01); *G03G 9/08704* (2013.01); *G03G 9/08791* (2013.01); *G03G 9/08793* (2013.01); *G03G 9/08795* (2013.01); *G03G 9/09* (2013.01)

(58) Field of Classification Search
CPC .. G03G 9/091; C09D 17/003; C09B 67/009; C09B 33/24; C09B 33/153; C08F 8/30
USPC ..................................... 430/108.23
See application file for complete search history.

(56) References Cited

U.S. PATENT DOCUMENTS

| 7,582,152 B2* | 9/2009 | Jaunky et al. ............. 106/31.52 |
| 8,815,484 B2* | 8/2014 | Tanaka et al. ........... 430/108.22 |
| 2006/0068306 A1* | 3/2006 | Shu et al. ........................ 430/45 |
| 2013/0095421 A1* | 4/2013 | Tanaka et al. ........... 430/108.23 |

FOREIGN PATENT DOCUMENTS

| JP | 43-003507 B1 | 2/1968 |
| JP | 2003-511514 A | 3/2003 |
| JP | 3917764 B2 | 5/2007 |
| JP | 3984840 B2 | 10/2007 |
| JP | 2009-501251 A | 1/2009 |
| JP | 2009-512738 A | 3/2009 |
| JP | 2013-071951 A | 4/2013 |
| WO | 99-42532 A1 | 8/1999 |
| WO | 01/25341 A1 | 4/2001 |
| WO | 2007/006637 A2 | 1/2007 |
| WO | WO 2007006634 A2 * | 1/2007 ............. C09B 67/00 |
| WO | 2009/157536 A1 | 12/2009 |

* cited by examiner

*Primary Examiner* — Christopher Rodee
(74) *Attorney, Agent, or Firm* — Canon U.S.A., Inc., IP Division

(57) ABSTRACT

To provide an azo compound which improves the dispersibility of an azo pigment in a non-water soluble solvent.
The purpose is achieved by an azo compound having a specific structure in which a high molecular weight polymer unit is bonded.

12 Claims, 2 Drawing Sheets

COMPOUND HAVING AZO SKELETON AND PIGMENT DISPERSANT, PIGMENT COMPOSITION, PIGMENT DISPERSION, AND TONER CONTAINING THE COMPOUND

TECHNICAL FIELD

The present invention relates to a novel compound having an azo skeleton and a pigment dispersant, a pigment composition, a pigment dispersion, and a toner containing the compound.

BACKGROUND ART

PTL 1 discloses a method using azo pigments as a toner colorant. When using such azo pigments as a toner colorant, it is necessary to finely disperse the pigments in a binder resin or a polymerizable monomer of a toner in order to increase the spectrum characteristics, such as coloring power and transparency.

However, when the pigments are finely dispersed in order to increase the spectral characteristics, such as coloring power and transparency, of the pigments, the growth, transition, and the like of crystals are likely to occur due to the heat history or the contact with a solvent in a dispersion process and subsequent manufacturing processes, which causes problems of a reduction in coloring power and transparency and the like.

In order to improve the dispersibility of the pigments, various pigment compositions and pigment dispersants constituting the same have been proposed. PTL 2 discloses an example of using a comb type polymer dispersant having an acid or basic portion known as Solsperse (Registered Trademark). Furthermore, PTL 3 discloses a polymer dispersant in which a portion having affinity with the azo pigment which is a colorant and an oligomer or a polymer portion having affinity with a solvent and a binder resin are bonded through a covalent bond.

CITATION LIST

Patent Literature

PTL 1 Japanese Patent No. 03917764
PTL 2 International Publication No. 99-42532
PTL 3 Japanese Patent No. 03984840

SUMMARY OF INVENTION

Since the affinity with the azo pigments of the pigment dispersants disclosed in PTL 2 and PTL 3 are not sufficient, the dispersibility of the pigments is not sufficient, so that an improvement of the color tone, transfer efficiency, and the like of the toner required in a high definition image is not satisfied. Furthermore, when a toner is manufactured by a polymerization method using the pigment dispersant and the azo pigment, a problem has occurred in which the viscosity of a pigment dispersion liquid increases in association with miniaturization of the pigment in a dispersion process of the pigment.

The present invention provides a pigment dispersant which can improve the dispersibility of a pigment in a non-water soluble solvent by imparting high affinity with an azo pigment, particularly high affinity with an acetoacetanilide pigment. The invention also provides a pigment composition having good dispersibility in a non-water soluble solvent. The invention further provides a pigment dispersion which is favorably dispersed in a non-water soluble solvent.

The above-described purposes are achieved by the invention described below.

More specifically, the invention relates to an azo compound having a structure, a high molecular weight polymer of which has a monomer unit represented by formula (2) and is bound to a structure represented by the following Formula (1).

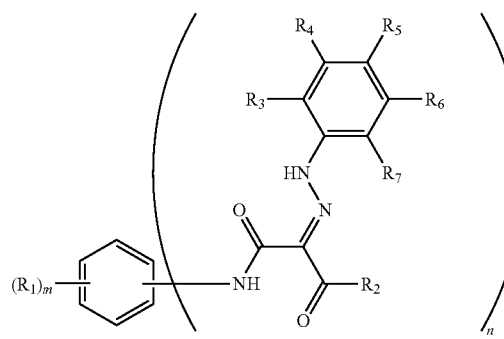

[Chem. 1]

in which, in Formula (1), $R_1$ each independently represents a hydrogen atom, a halogen atom, an alkyl group having 1 to 6 carbon atoms, an alkoxy group having 1 to 6 carbon atoms, a trifluoromethyl group, or a cyano group, $R_2$ represents an alkyl group having 1 to 6 carbon atoms, a phenyl group, an alkoxy group having 1 to 6 carbon atoms, or an amino group, at least one of $R_3$ to $R_7$ is bonded to the high molecular weight polymer through a linking group, m represents an integer of 3 or 4, n represents an integer of 2 or 3, and m+n is 6; and

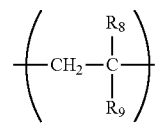

[Chem. 2]

in Formula (2), $R_8$ represents a hydrogen atom or an alkyl group having 1 to 6 carbon atoms and $R_9$ represents a phenyl group, a carboxyl group, a carboxylic acid ester group, or a carboxylic acid amide group.

DESCRIPTION OF EMBODIMENT

Figure 1:
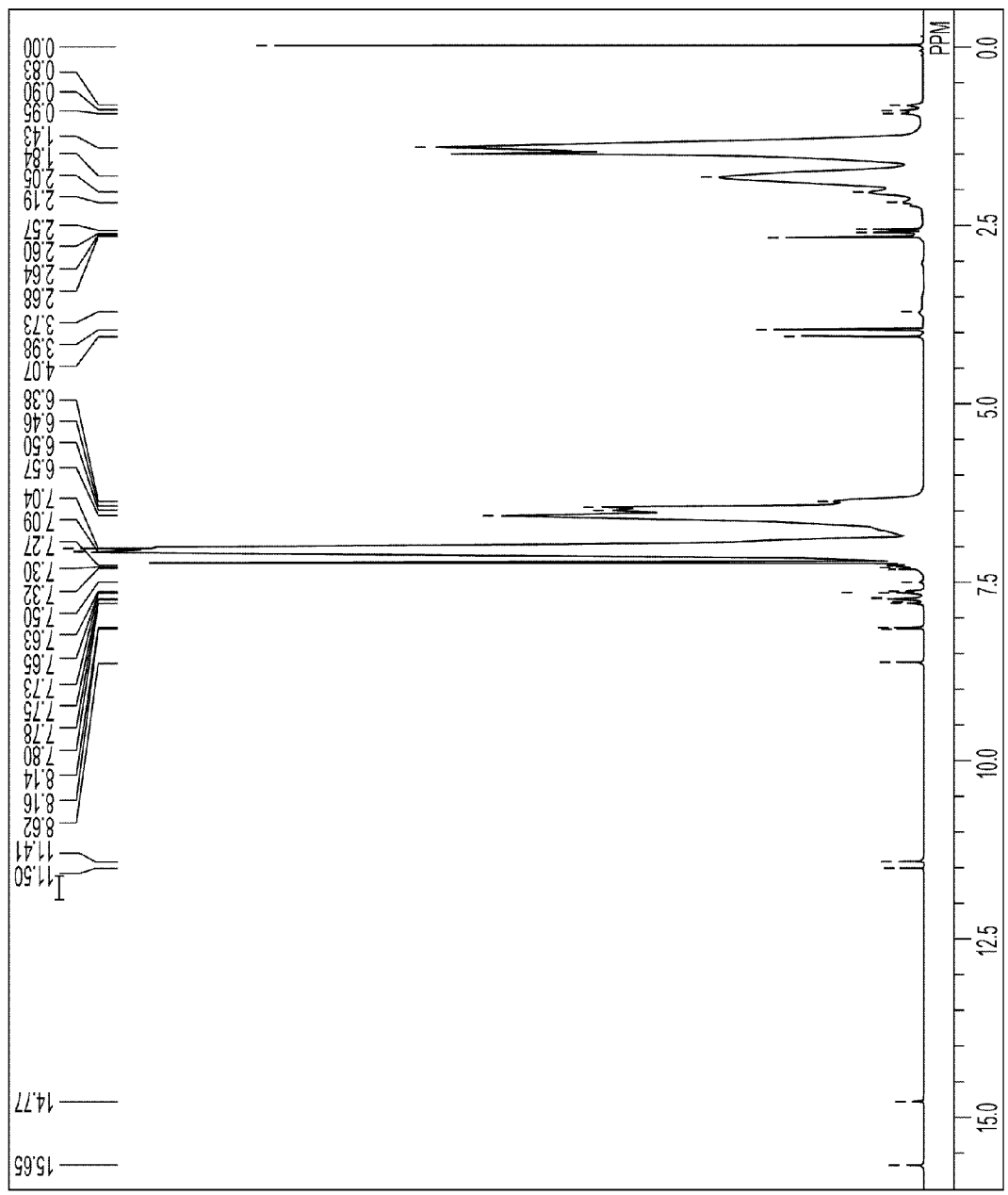
FIG. 1 is a view illustrating the $^1$H NMR spectrum at room temperature and at 400 MHz in CDCl$_3$ of a compound (46) having an azo skeleton unit of the invention.

First, an azo compound has a structure, a high molecular weight polymer of which has a monomer unit represented by formula (2) and is bound a structure represented by the following Formula (1) is described in detail.

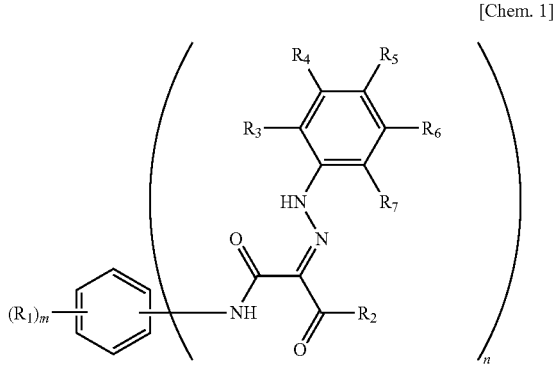

In the azo compound represented by Formula (1) above, $R_1$ each independently represents a hydrogen atom, a halogen atom, an alkyl group having 1 to 6 carbon atoms, an alkoxy group having 1 to 6 carbon atoms, a trifluoromethyl group, or a cyano group.

As the halogen atom in $R_1$ in Formula (1) above, a fluorine atom, a chlorine atom, a bromine atom, and an iodine atom are mentioned.

The alkyl group in $R_1$ in Formula (1) above is not particularly limited insofar as the number of carbon atoms is 1 to 6. For example, linear, branched, or cyclic alkyl groups, such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group are mentioned.

The alkoxy group in $R_1$ in Formula (1) above is not particularly limited insofar as the number of carbon atoms is 1 to 6. For example, linear, branched, or cyclic alkoxy groups, such as a methoxy group, an ethoxy group, an n-propoxy group, an n-butoxy group, an isopropoxy group, and a tert-butoxy group are mentioned.

As the substitution position of $R_1$ and an acylacetamide group in Formula (1) above, when n in Formula (1) is 2, acylacetamide groups are suitably located at the p-position or m-position in terms of the affinity with the pigment. When n in Formula (1) is 3, cases where an acylacetamide group is bonded to the 1,2,3-position, the 1,2,4-position, and the 1,3,5-position of the benzene ring to be bonded are mentioned. In particular, a case where an acylacetamide group is bonded to the 1,3,5-portion is suitable from the viewpoint of availability of raw materials.

The alkyl group in $R_2$ in Formula (1) above is not particularly limited insofar as the number of carbon atoms is 1 to 6. For example, linear, branched, or cyclic alkyl groups, such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group are mentioned, for example.

The alkoxy group in $R_2$ in Formula (1) above is not particularly limited insofar as the number of carbon atoms is 1 to 6. For example, linear, branched, or cyclic alkoxy groups, such as a methoxy group, an ethoxy group, an n-propoxy group, an n-butoxy group, and an isopropoxy group, are mentioned.

The amino group in $R_2$ in Formula (1) above is not particularly limited. For example, unsubstituted amino groups, mono-substituted amino groups, such as an N-methylamino group, an N-butylamino group, an N-hexylamino group, an N-tetradecylamino group, an N-phenylamino group, and an N-naphtylamino group, di-substituted amino groups, such as an N,N-dimethylamino group, an N,N-diethylamino group, an N,N-diphenylamino group, and an N,N-methylpropylamino group, and acylamino groups, such as an acetylamino group, are mentioned.

The substituents of $R_2$ in Formula (1) above may be further substituted by a substituent insofar as the affinity with the pigment is not remarkably impaired. In this case, as substituents which may be substituted, a halogen atom, a nitro group, a hydroxyl group, a cyano group, a trifluoromethyl group, and the like are mentioned.

$R_2$ in Formula (1) above is suitably a methyl group from the viewpoint of the affinity with the pigment.

In the azo compound of the invention, $R_3$ to $R_7$ in Formula (1) above each independently represents a hydrogen atom, a halogen atom, an alkyl group, an alkoxy group, a trifluoromethyl group, a cyano group, or a linking group L. The linking group L is bonded to the high molecular weight polymer. At least one of $R_3$ to $R_7$ is the linking group L.

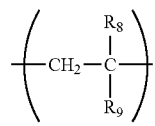

In Formula (2), $R_8$ represents a hydrogen atom or an alkyl group having 1 to 6 carbon atoms and $R_9$ represents a phenyl group, a carboxyl group, a carboxylic acid ester group, or a carboxylic acid amide group.

The linking group L is not particularly limited insofar as it is a divalent linking group. From the viewpoint of ease of manufacturing, linking through an amide bond or an ester bond is suitable. Particularly suitably, a carboxylic acid amide bond, a sulfonic acid amide bond, a carboxylic acid ester bond, and a sulfonic acid ester bond are mentioned. For example, the following structures can be shown as an example. The linking group L is bonded to the azo skeleton unit at an L' portion and bonded to a high molecular weight polymer unit at an L" portion.

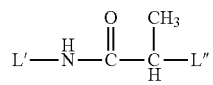

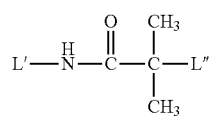

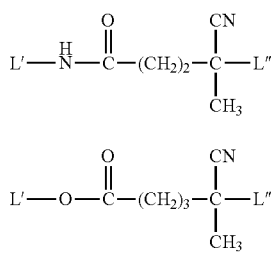

The linking group L is particularly suitably a carboxylic amide bond in terms of ease of synthesis.

Next, the high molecular weight polymer unit having a monomer unit represented by Formula (2) above is described in detail.

The alkyl group in $R_8$ in Formula (2) above is not particularly limited insofar as the number of carbon atoms is 1 to 6. For example, linear, branched, or cyclic alkyl groups, such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group are mentioned.

$R_8$ in Formula (2) above is suitably a hydrogen atom or a methyl group from the viewpoint of ease of manufacturing.

The carboxylic acid ester group in $R_9$ in Formula (2) above is not particularly limited and, for example, linear or branched ester groups, such as a methyl ester group, an ethyl ester group, an n-propyl ester group, an isopropyl ester group, an n-butyl ester group, an isobutyl ester group, a sec-butyl ester group, a tert-butyl ester group, a 2-ethylhexyl ester group, a phenyl ester group, a 2-hydroxyethyl ester group, an octyl ester group, a nonyl ester group, a decyl ester group, an undecyl ester group, a dodecyl ester group, a hexadecyl ester group, an octadecyl ester group, an eicosyl ester group, and a docosanyl ester group.

As the carboxylic acid amide group in $R_9$ in Formula (2) above, amide groups, such as an N-methyl amide group, an N,N-dimethyl amide group, an N,N-diethyl amide group, an N-isopropyl amide group, an N-tert-butyl amide group, an N-phenyl amide group, an N-(2-ethylhexyl)amide group, and an N,N-di(2-ethylhexyl)amide group are mentioned.

The substituent of $R_9$ in Formula (2) above may be further substituted and is not particularly limited insofar as the polimerizabiity of the monomer unit is not impaired and the solubility of the compound having the azo skeleton unit is not remarkably reduced. In this case, as substituents which may be substituted, alkoxy groups, such as a methoxy group and an ethoxy group, amino groups, such as an N-methyl amino group and an N,N-dimethylamino group, acyl groups, such as an acetyl group, and halogen atoms, such as a fluorine atom and a chlorine atom, are mentioned.

$R_9$ in Formula (2) above is suitably a phenyl group or a carboxylic acid ester group in terms of the dispersibility and compatibility in the binder resin of the toner.

In the high molecular weight polymer unit, the affinity with a dispersion medium can be controlled by changing the proportion of the monomer unit represented by Formula (2) above. When the dispersion medium is a nonpolar solvent, such as styrene, it is suitable to increase the proportion of the monomer unit in which $R_9$ in Formula (2) above is represented by a phenyl group in terms of the affinity with the dispersion medium. When the dispersion medium is a solvent having a certain degree of polarity, such as acrylic acid ester, it is suitable to increase the proportion of the monomer unit in which $R_9$ is represented by a carboxyl group, a carboxylic acid ester group, or a carboxylic acid amide group in terms of the affinity with the dispersion medium.

With respect to the molecular weight of the high molecular weight polymer unit of the invention, a case where the number average molecular weight is 500 or more is suitable in terms of increasing the dispersibility of the pigment. When the molecular weight is larger, the effect of increasing the dispersibility of the pigment is higher. However, when the molecular weight is excessively large, the affinity with a non-water soluble solvent decreases, which is not suitable. Therefore, the number average molecular weight of the high molecular weight polymer unit is suitably 200000 or lower. In addition, when considering ease of manufacturing, the number average molecular weight of the high molecular weight polymer unit is more suitably in the range of 2000 to 50000.

As disclosed in PCT Japanese Translation Patent Publication No. 2003-531001, a method is known which includes increasing the dispersibility by introducing a branched aliphatic chain to the terminal in a polyoxy alkylene carbonyl dispersant. Also in the high molecular weight polymer unit of the invention, when a telechelic high molecular weight polymer unit is synthesized by a method, such as Atom Transfer Radial Polymerization (ATRP) described later, a branched aliphatic chain can be introduced into the terminal, so that the dispersibility increases in some cases.

The substitution positions of the azo skeleton units in the compound having the azo skeleton units of the invention are suitably unevenly present at one end while forming one or two or more blocks because the effect of increasing the dispersibility is high.

With respect to the azo skeleton units in the compound having the azo skeleton units, a plurality of the azo skeleton units may be bonded to the high molecular weight polymer unit. The number of the azo skeleton units is suitably in the range of 1 to 10 and more suitably 1 to 5 relative to 500 monomer units forming the high molecular weight polymer portion. When the number of the azo skeleton units is in the ranges mentioned above, the balance of the affinity with the pigment and the affinity with the non-water soluble solvent becomes particularly good.

With respect to the azo compound represented by Formula (1) above, tautomers represented by the following Formulae (5) and (6) as illustrated in the following view are present and these tautomers are included in the scope of the invention.

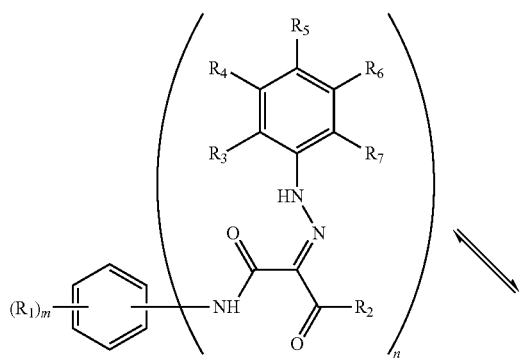

[Chem. 1]

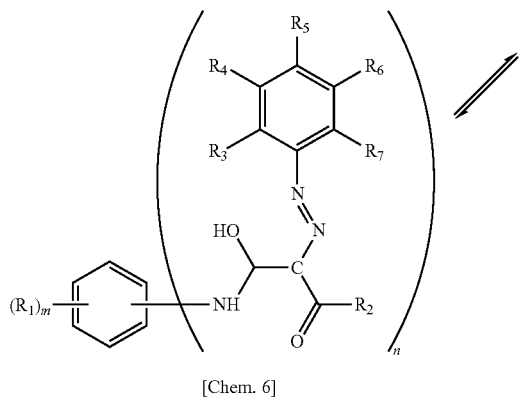

[Chem. 6]

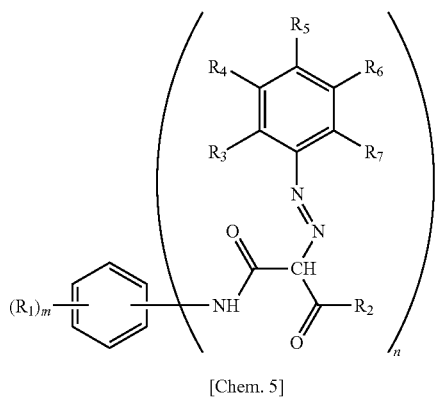

[Chem. 5]

$R_1$, $R_2$, m, and n in Formulae (5) and (6) are synonymous with $R_1$, $R_2$, m, and n in Formula (1), respectively.

As methods for synthesizing the azo compound of the invention, the following methods (i) to (v) are mentioned, for example.

First, the method (i) is described in detail with reference to an example of a scheme shown below. The method (i) includes synthesizing an azo skeleton unit and a high molecular weight polymer unit beforehand, and then linking them by a condensation reaction or the like to thereby synthesize the azo compound. An example of synthesis schemes to an azo compound intermediate (11) is shown below.

Method (i)

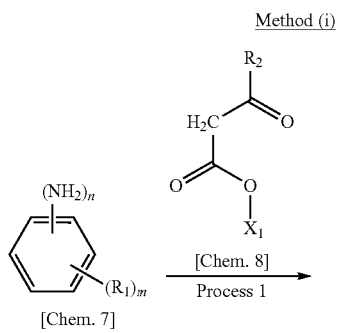

[Chem. 7] [Chem. 8] Process 1

-continued

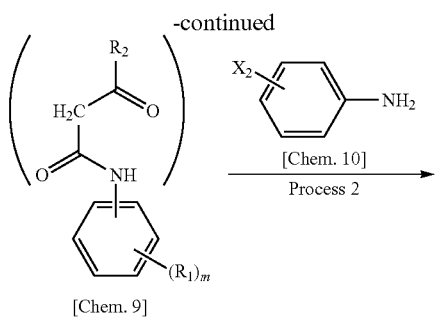

[Chem. 9] [Chem. 10] Process 2

[Chem. 11]

$R_1$ and $R_2$ in Formulae (7) to (9) and (11) are synonymous with those in Formula (1) above. $X_1$ in Formula (8) represents a leaving group. $X_2$ in Formula (10) represents a substituent forming the linking group L in Formula 1 or 4 above. m is an integer of 3 or 4. n is an integer of 2 or 3. m+n is 6.

In the scheme shown above as an example, the azo skeleton unit can be synthesized by a process 1 of amidating an aniline derivative represented by Formula (7) and an acetoacetic acid analog represented by Formula (8) to synthesize an intermediate (9) which is an acetoacetanilide analog and a process 2 of diazo-coupling the intermediate (9) and an aniline derivative (10) to synthesize an azo compound (11).

First, the process 1 is described. In the process 1, known methods can be used (for example, Datta E. Ponde, and other four persons, "The Journal of Organic Chemistry" (U.S.), American Chemical Society, 1998, Volume 63, No. 4, p.p. 1058 to 1063". When $R_2$ in Formula (9) is a methyl group, the intermediate can be synthesized also by a method using diketene in place of the raw material (8) (for example, Kiran Kumar Solingapuram Sai, and other two persons, "The Journal of Organic Chemistry" (U.S.), American Chemical Society, 2007, Volume 72, No. 25, p.p. 9761 to 9764".

Various kinds of the aniline derivative (7) and the acetoacetic acid analog (8) are commercially available, so that the aniline derivative (7) and the acetoacetic acid analog (8) can be easily obtained. The aniline derivative (7) and the acetoacetic acid analog (8) can be easily synthesized by known methods.

Although this process can also be carried out in the absence of a solvent, the process is suitably carried out in the presence of a solvent in order to prevent a rapid progress of the reaction. The solvent is not particularly limited insofar as the reaction is not blocked. For example, alcohols, such as methanol, ethanol, and propanol, esters, such as methyl acetate, ethyl acetate, and propyl acetate, ethers, such as diethylether, tetrahydrofuran, and dioxane, hydrocarbons, such as benzene, toluene, xylene, hexane, and heptane, halogen containing hydrocarbons, such as dichloromethane, dichloroethane, and chloroform, amides, such as N,N-dimethylformamide, N-methylpyrrolidone, and N,N-dimethyl imidazolidinone, nitriles, such as acetonitrile and propionitrile, acids, such as formic acid, acetic acid, and propionic acid, water, and the like are mentioned. The solvents mentioned above can be used as a mixture of two or more kinds and the mixing ratio in the case of mixing the solvents can be arbitrarily determined according to the solubility of a substrate. The use amount of the solvents can be arbitrarily determined and is suitably in the range of 1.0 to 20 mass times that of the compound represented by Formula (7) above from the viewpoint of reaction velocity.

This process is usually performed in a temperature range of 0° C. to 250° C. and is usually completed within 24 hours.

Next, the process 2 is described. In the process 2, known methods can be used. Specifically, a method described below is mentioned, for example. First, the aniline derivative (10) is allowed to react with a diazotization agent, such as sodium nitrite or nitrosyl sulfate, in the presence of inorganic acid, such as hydrochloric acid or sulfuric acid, in a methanol solvent to synthesize a corresponding diazonium salt. Furthermore, the diazonium salt is coupled with the intermediate (9) to synthesize the azo compound (11).

Various kinds of the aniline derivative (10) are commercially available, so that the aniline derivative (10) can be easily obtained. The aniline derivative (10) can be easily synthesized by known methods.

Although this process can also be carried out in the absence of a solvent, the process is suitably carried out in the presence of a solvent in order to prevent a rapid progress of the reaction. The solvent is not particularly limited insofar as the reaction is not blocked. For example, alcohols, such as methanol, ethanol, and propanol, esters, such as methyl acetate, ethyl acetate, and propyl acetate, ethers, such as diethylether, tetrahydrofuran, and dioxane, hydrocarbons, such as benzene, toluene, xylene, hexane, and heptane, halogen containing hydrocarbons, such as dichloromethane, dichloroethane, and chloroform, amides, such as N,N-dimethylformamide, N-methylpyrrolidone, and N,N-dimethyl imidazolidinone, nitriles, such as acetonitrile and propionitrile, acids, such as formic acid, acetic acid, and propionic acid, water, and the like are mentioned. The solvents mentioned above can be used as a mixture of two or more kinds and the mixing ratio in the case of mixing the solvents can be arbitrarily determined according to the solubility of a substrate. The use amount of the solvents can be arbitrarily determined and is suitably in the range of 1.0 to 20 mass times that of the compound represented by Formula (9) above from the viewpoint of reaction velocity.

This process is usually performed in a temperature range of −50° C. to 100° C. and is usually completed within 24 hours.

As a method for synthesizing the azo compound represented by Formula (1) or (4) above from the obtained azo compound intermediate (11), methods (ii) to (iv) below are mentioned, for example.

First, the method (ii) is described in detail with reference to a scheme shown below.

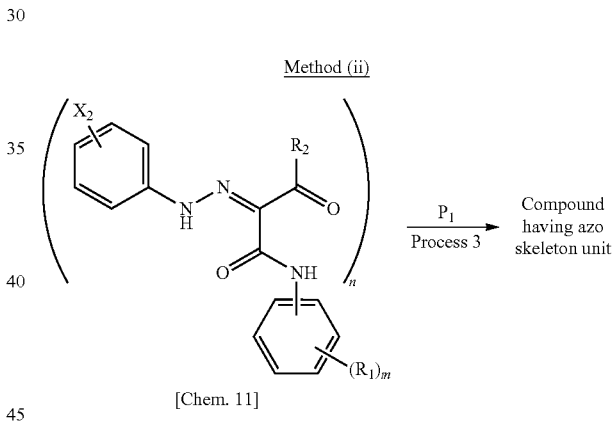

[Chem. 11]

$R_1$ to $R_2$, $X_2$, m, and n in Formula (11) are synonymous with those in Formula (11) in the synthesis scheme to the azo compound intermediate (11). $P_1$ represents the high molecular weight polymer unit having the monomer unit represented by Formula (2) above.

First, a method for synthesizing the high molecular weight polymer unit $P_1$ to be used in the process 3 is described. In the synthesis of the high molecular weight polymer unit $P_1$, known polymerization methods can be utilized, [for example, Krzysztof Matyjaszewski, and other one person, "Chemical Reviews" (U.S.), American Chemical Society, 2001, Volume 101, p.p. 2921 to 2990].

Specifically, radical polymerization, cationic polymerization, and anionic polymerization are mentioned. It is suitable to use radical polymerization in terms of ease of manufacturing.

The radical polymerization can be performed by the use of a radical polymerization initiator, irradiation with radiation, laser light, and the like, combined use of a photopolymerization initiator and irradiation with light, heating, and the like.

As the radical polymerization initiator, any substance may be used insofar as the substance can generate radicals to initiate a polymerization reaction. The radical polymerization initiator is selected from compounds generating radicals by the action of heat, light, radiation, an oxidation-reduction reaction, and the like. For example, azo compounds, organic peroxides, inorganic peroxides, organic metallic compounds, photopolymerization initiators, and the like are mentioned. More specifically, azo polymerization initiators, such as 2,2'-azobis(isobutyronitrile), 2,2'-azobis(2-methylbutyronitrile), 2,2'-azobis(4-methoxy-2,4-dimethylvaleronitrile), and 2,2'-azobis(2,4-dimethylvaleronitrile), organic peroxide polymerization initiators, such as benzoyl peroxide, di-tert-butyl peroxide, tert-butylperoxyisopropyl carbonate, tert-hexylperoxybenzoate, and tert-butylperoxybenzoate, inorganic peroxide polymerization initiators, such as potassium persulfate and ammonium persulfate, redox initiators, such as a hydrogen peroxide-ferrous iron type, a benzoyl peroxide-dimethyl aniline type, and a cerium (IV) salt-alcohol type, and the like are mentioned. As the photopolymerization initiators, a benzophenone type, a benzoinether type, an acetophenone type, a thioxanthone type, and the like are mentioned. These radical polymerization initiators may be used in combination of two or more kinds.

The use amount of the polymerization initiator in this case is suitably adjusted in the range of 0.1 to 20 parts by mass relative to 100 parts by mass of monomers in such a manner as to obtain a copolymer having a target molecular weight distribution.

The high molecular weight polymer unit represented by $P_1$ can also be manufactured using any method of solution polymerization, suspension polymerization, emulsification polymerization, dispersion polymerization, precipitation polymerization, mass polymerization, and the like without particular limitation and solution polymerization in a solvent capable of dissolving ingredients to be used in manufacturing is suitable. Specifically, polar organic solvents, such as alcohols, such as methanol, ethanol, and 2-propanol, ketones, such as acetone and methyl ethyl ketone, ethers, such as tetrahydrofuran and diethylether, ethylene glycol monoalkyl ethers or acetates thereof, propylene glycol monoalkyl ethers or acetates thereof, and diethylene glycol monoalkyl ethers, and, depending on the cases, nonpolar solvents, such as toluene and xylene, can be used singly or as a mixture, for example. Among the above, the solvents whose boiling point is in the temperature range of 100 to 180° C. are more suitably used singly or as a mixture.

With respect to the polymerization temperature, a suitable temperature range varies depending on the type of the radical polymerization reaction. Specifically, it is common to perform polymerization in a temperature range of −30 to 200° C. and a more suitable temperature range is 40 to 180° C.

In the high molecular weight polymer unit represented by $P_1$, the molecular weight distribution and the molecular structure can be controlled using known methods. Specifically, the high molecular weight polymer unit in which the molecular weight distribution and the molecular structure are controlled can be manufactured by the use of a method utilizing an addition cleavage type chain transfer agent (Japanese Patent Nos. 4254292 and 03721617), an NMP method utilizing dissociation and bonding of amine oxide radicals [e.g., Craig J. Hawker, and other two persons, "Chemical Reviews", (U.S.), American Chemical Society, 2001, Volume 101, p.p. 3661 to 3688], an ATRP method for performing polymerization using a heavy metal and a ligand using a halogen compound as a polymerization initiator [e.g., Masami Kamigaito, and other two persons, "Chemical Reviews" (U.S.), American Chemical Society, 2001, Volume 101, p.p. 3689 to 3746], an RAFT method using dithiocarboxylic acid ester, a xanthate compound, and the like as a polymerization initiator. (e.g., PCT Japanese Translation Patent Publication No. 2000-515181), an MADIX method (e.g., International Publication No. 99/05099 pamphlet), a DT method [e.g., Atsushi Goto, and other six persons, "Journal of The American Chemical Society", (U.S.), American Chemical Society, 2003, Volume 125, p.p. 8720 to 8721], or the like.

Next, the process 3 is described. In the process 3, known methods can be utilized. Specifically, the azo compound in which the linking group L has a carboxylic acid ester bond represented by Formula (1) or (4) above can be synthesized by the use of the high molecular weight polymer unit $P_1$ having a carboxyl group and the azo compound (11) in which $X_2$ is a substituent having a hydroxyl group, for example. Moreover, the azo compound in which the linking group L has a sulfonic acid ester bond can be synthesized by the use of the high molecular weight polymer unit $P_1$ having a hydroxyl group and a raw material in which $X_2$ in Formula (11) is a substituent having a sulfonic acid group. Furthermore, the azo compound in which the linking group L has a carboxylic acid amide bond represented by Formula (1) or (4) above can be synthesized by the use of the high molecular weight polymer unit $P_1$ having a carboxyl group and a raw material in which $X_3$ in Formula (11) is a substituent having an amino group. Specifically, a method using a dehydration-condensation agent, e.g., 1-ethyl-3-(3-dimethylamino propyl)carbodiimide hydrochloride and the like (e.g., Melvin S. Newman, and other one person, "The Journal of Organic Chemistry" (U.S.), American Chemical Society, 1961, Volume 26, No. 7, p.p. 2525 to 2528) and Schotten-Baumann method (e.g., Norman O. V. Sonntag, "Chemical Reviews", (U.S.), American Chemical Society, 1953, Volume 52, No. 2, p.p. 237 to 416), and the like are mentioned.

Although this process can also be carried out in the absence of a solvent, the process is suitably carried out in the presence of a solvent in order to prevent a rapid progress of the reaction. The solvent is not particularly limited insofar as the reaction is not blocked. For example, ethers, such as diethylether, tetrahydrofuran, and dioxane, hydrocarbons, such as benzene, toluene, xylene, hexane, and heptane, halogen containing hydrocarbons, such as dichloromethane, dichloroethane, and chloroform, amides, such as N,N-dimethylformamide, N-methylpyrrolidone, and N,N-dimethyl imidazolidinone, nitriles, such as acetonitrile and propionitrile, and the like are mentioned. The solvents mentioned above can be used as a mixture of two or more kinds and the mixing ratio in the case of mixing the solvents can be arbitrarily determined according to the solubility of a substrate. The use amount of the solvents can be arbitrarily determined and is suitably in the range of 1.0 to 20 mass times that of the compound represented by Formula (11) above in terms of reaction velocity.

This process is usually performed in a temperature range of 0° C. to 250° C. and is usually completed within 24 hours.

Next, the method (iii) is described in detail with reference to an example of a scheme shown below.

Method (iii)

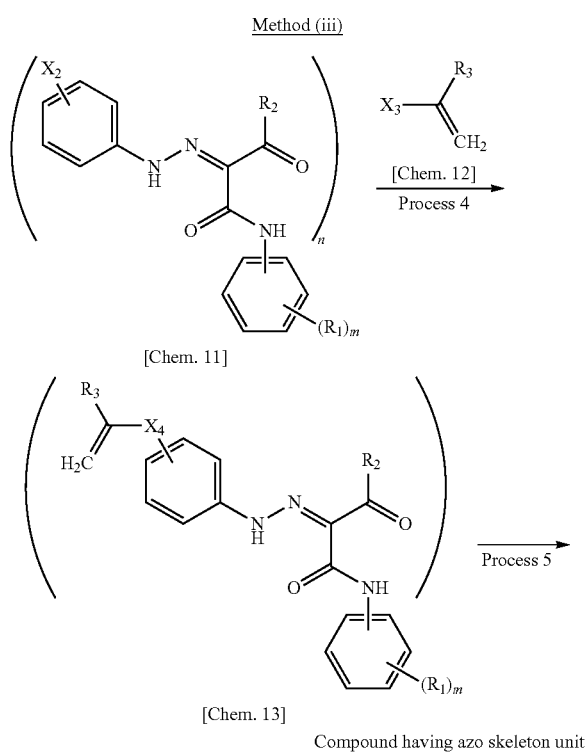

[Chem. 11]

[Chem. 13]

Compound having azo skeleton unit $R_1$ to $R_2$, $X_2$, m, and n in Formula (11) are synonymous with those in Formula (11) in the synthesis scheme to the azo compound intermediate (11). In Formula (12), $R_3$ represents a hydrogen atom or an alkyl group and $X_3$ reacts to $X_2$ in Formula (11) to form a linking group $X_4$ in Formula (13). $R_1$ to $R_2$, $R_3$, m, and n in Formula (13) are synonymous with those in Formulae (11) and (12) and $X_4$ represents a linking group formed by a reaction of $X_2$ in Formula (11) and $X_3$ in Formula (12).

In the scheme shown above, the azo compound represented by Formula (1) or (4) is synthesized by a process 4 of introducing a vinyl group-containing compound represented by Formula (12) into the azo compound intermediate represented by Formula (11) to synthesize a polymerizable monomer (13) having the azo compound skeleton and a process 5 of copolymerizing the polymerizable monomer having the azo compound skeleton and a polymerizable monomer forming the monomer unit represented by Formula (2) above.

First, the process 4 is described. In the process 4, the polymerizable monomer (13) having the azo compound skeleton can be synthesized by utilizing the same method as that of the process 3 of the method (i) described above.

Various kinds of the vinyl group-containing compound (12) are commercially available, so that the vinyl group-containing compound (12) can be easily obtained. The vinyl group-containing compound (12) can be easily synthesized by known methods.

Next, the process 5 is described. In the process 5, the azo compound represented by Formula (1) or (4) can be synthesized by polymerizing the polymerizable monomer (13) and a polymerizable monomer forming the monomer unit represented by Formula (2) above utilizing the same method as that in the synthesis of the high molecular weight polymer unit $P_1$ of the method (i) described above.

Next, a method (iv) is described in detail with reference to an example of a scheme shown below.

Method (iv)

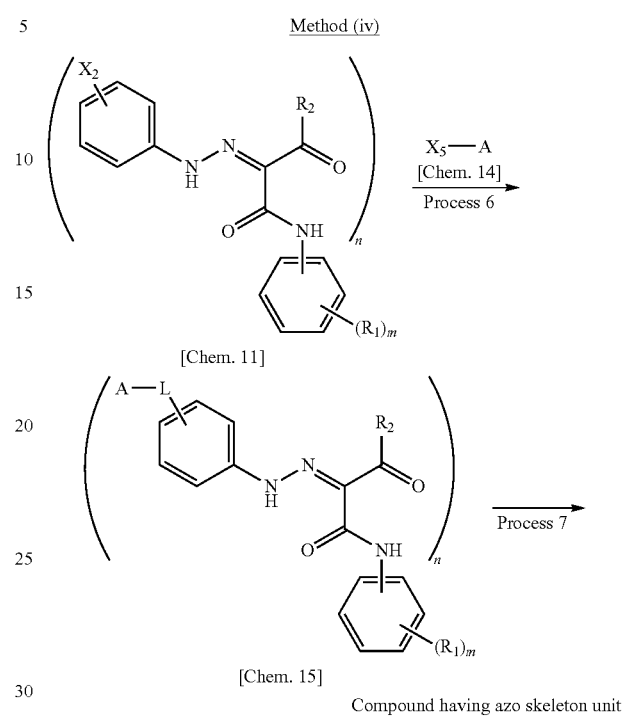

[Chem. 11]

[Chem. 15]

Compound having azo skeleton unit $R_1$ to $R_2$, $X_2$, m, and n in Formula (11) are synonymous with those in Formula (11), in the synthesis scheme to the azo compound intermediate (11). In Formula (14), $X_5$ represents a substituent which reacts with $X_2$ in Formula (11) to form L in Formula (15) and A represents a chlorine atom, a bromine atom, or an iodine atom. $R_1$ to $R_2$, A, m, and n, in Formula (15) are synonymous with those in Formula (11) above and L represents a linking group formed by a reaction of $X_2$ in Formula (11) and $X_5$ in Formula (14).

In the scheme shown above, the azo compound is synthesized by a process 6 of introducing a halogen atom-containing compound represented by Formula (14) into the azo compound intermediate represented by Formula (11) to synthesize an azo compound intermediate (15) having a halogen atom and a process 7 of polymerizing polymerizable monomers using the azo compound intermediate (15) having a halogen atom as a polymerization initiator.

First, the process 6 is described. In the process 6, the azo compound intermediate (15) having a halogen atom can be synthesized utilizing the same method as the process 3 of the method (i) described above. Specifically, by the use of the halogen atom-containing compound (14) having a carboxyl group and the azo compound (11) in which $X_2$ is a substituent having a hydroxyl group, the azo compound represented by Formula (1) or (4) above having a structure in which the linking group L has a carboxylic acid ester bond can be finally synthesized. Moreover, by the use of the halogen atom-containing compound (14) having a hydroxyl group and a raw material in which $X_2$ in Formula 11 is a substituent having a sulfonic acid group, the azo compound represented by Formula (1) or (4) above having a structure in which the linking group L has a sulfonic acid ester bond can be finally synthesized. Furthermore, by the use of the halogen atom-containing compound (14) having a carboxyl group and a raw material in which $X_2$ in Formula (11) is a substituent having an amino group, the azo compound represented by Formula (1) or (4) above having a structure in which the linking group L has a carboxylic acid amide bond can be finally synthesized.

Mentioned as the halogen atom-containing compound (14) having a carboxyl group are, for example, chloracetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-β-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-β-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodine-α-phenylpropionic acid, α-iodine-β-phenylpropionic acid, β-chlorobutyric acid, β-bromoisobutyric acid, iododimethyl methylbenzoate, 1-chloroethyl benzoate, and the like. Acid halides and acid anhydrides thereof can also be similarly used in the invention.

Mentioned as the halogen atom-containing compound (14) having a hydroxyl group are, for example, 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, 2-phenyl-2-iodoethanol, and the like.

Next, the process 7 is described. In the process 7, the azo compound of the invention can be synthesized by polymerizing polymerizable monomers forming the monomer unit represented by Formula (2) above in the presence of a metal catalyst and a ligand using the organic halide (15) as a polymerization initiator utilizing the ATRP method in the method (iv) described above.

The metal catalyst for use in the ATRP method is not particularly limited and is suitably at least one kind of a transition metal selected from elements of Periodic Table Groups VII to XI. In redox catalysts (redox conjugated complexes) in which a low valent complex and a high valent complex reversibly change, mentioned as a low valent metal to be used is, specifically, a metal selected from the group of $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$. Among the above, $Cu^+$, $Ru^{2+}$, $Fe^{2+}$, or $Ni^{2+}$ is suitable and $Cu^+$ is particularly suitable in terms of availability of raw materials. As monovalent copper compounds, cuprous chloride, cuprous bromide, cuprous iodide, cuprous cyanide, and the like can be suitably used, for example.

As ligands for use in the ATRP method, organic ligands are generally used. Specifically, 2,2'-bipyridyl and derivatives thereof, 1,10-phenanthroline and derivatives thereof, tetramethylethylenediamine, N,N,N',N'',N''-pentamethyl diethylene triamine, tris(dimethylaminoethyl)amine, triphenylphosphine, tributylphosphine, and the like are mentioned. In particular, aliphatic polyamines, such as N,N,N', N'',N''-pentamethyl diethylene triamine, are suitable in terms of availability of raw materials.

For the compounds represented by Formulae (1), (4), (9), (11), (13), and (15) above obtained in each process, usual isolation and purification methods of organic compounds can be used. As the isolation and purification methods, a recrystallization method and a reprecipitation method using an organic solvent, column chromatography using silica gel or the like, and the like are mentioned, for example. By purifying the compound using one of the methods or two or more of the methods in combination, the purity can be increased.

The compounds represented by Formulae (9), (11), (13), and (15) obtained in each process were identified and quantified by nuclear magnetic resonance spectroscopic analysis [ECA-400, manufactured by JEOL Co., Ltd.], ESI-TOF MS (LC/MSD TOF, manufactured by Agilent Technologies), and HPLC analysis [LC-20A, manufactured by Shimadzu Corporation].

The compounds represented by Formulae (1) and (4) obtained in each process were identified and quantified by high-speed GPC [HLC8220GPC, manufactured by TOSOH CORP.], nuclear magnetic resonance spectroscopic analysis [ECA-400, manufactured by JEOL Co., Ltd.], and by acid value measurement based on JISK-0070 [Automatic titration measuring device COM-2500, manufactured by Hiranuma Sangyo Co., Ltd.].

Next, the pigment dispersant and the pigment composition of the invention are described. The azo compound represented by Formula (1) above of the invention has high affinity with the azo pigment, particularly an acetoacetanilide pigment, and high affinity with a non-water soluble solvent, and therefore can be used as a pigment dispersant singly or in combination of two or more kinds.

The pigment dispersant of the invention may contain the azo compound represented by Formula (1) above. The pigment composition of the invention is used for coating materials, ink, toner, and resin molded articles and has a feature of containing a pigment and at least one kind of the azo compounds represented by Formula (1) above as a pigment dispersant. As the pigment, azo pigments, particularly acetoacetanilide pigment, are suitable as described above.

Next, the pigment dispersion of the invention is described. The pigment dispersion of the invention contains the pigment composition and a non-water soluble solvent. As the non-water soluble solvent, a styrene monomer can be mentioned as an example. The pigment composition may be dispersed in a non-water soluble solvent or each constituent component of the pigment composition may be dispersed in a non-water soluble solvent. Specifically, the pigment dispersion is obtained as follows, for example. The pigment dispersant and a resin as required are dissolved into a dispersion medium, and then a pigment or a pigment composition powder is gradually added under stirring to sufficiently mix the same with the dispersion medium. Furthermore, by applying mechanical shearing force by a dispersing machine, such as a ball mill, a paint shaker, a dissolver, an attritor, a sand mill, and a high speed mill, the pigment can be stably finely-dispersed into uniform fine particles.

Next, the binder resin of the toner of the invention is described. The azo compound represented by Formula (1) or (4) above of the invention has high affinity with the azo pigment, particularly an acetoacetanilide pigment, and high affinity with a non-water soluble solvent, and therefore can be used as a pigment dispersant singly or in combination of two or more kinds.

The pigment usable in the invention, mono-azo pigments, bis-azo pigments, or poly-azo pigments are mentioned. Among the above, acetoacetanilide pigments typified by C.I. Pigment Yellow 74, C.I. Pigment Yellow 93, C.I. Pigment Yellow 128, C.I. Pigment Yellow 155, C.I. Pigment Yellow 175, C.I. Pigment Yellow 180 have higher affinity with the pigment dispersant of the invention, and therefore are suitable. In particular, C.I. Pigment Yellow 155 represented by the following Formula (3) has a high dispersion effect by the compound having the azo skeleton unit of the invention, and therefor is more suitable. The pigments may be used singly or as a mixture of two or more kinds.

[Chem. 3]

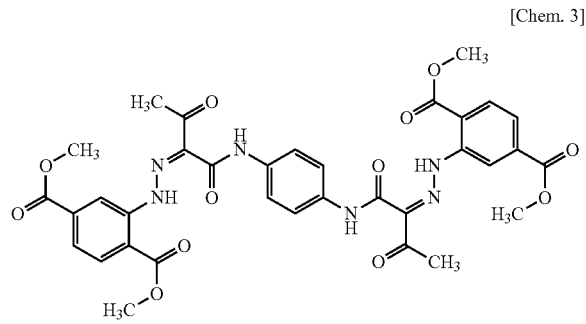 [SMILES: COC(=O)c1ccc(C(=O)OC)c(N/N=C(/C(C)=O)C(=O)Nc2ccc(NC(=O)/C(=N\Nc3cc(C(=O)OC)ccc3C(=O)OC)C(C)=O)cc2)c1]

As the pigment usable in the invention, any pigment other than the yellow pigments mentioned above can be suitably used without limitation insofar as the pigment has affinity with the pigment dispersant of the invention.

For example, mentioned are azo pigments, such as C.I. Pigment Orange 1, C.I. Pigment Orange 5, C.I. Pigment Orange 13, C.I. Pigment Orange 15, C.I. Pigment Orange 16, C.I. Pigment Orange 34, C.I. Pigment Orange 36, C.I. Pigment Orange 38, C.I. Pigment Orange 62, C.I. Pigment Orange 64, C.I. Pigment Orange 67, C.I. Pigment Orange 72, C.I. Pigment Orange 74, C.I. Pigment Red 2, C.I. Pigment Red 3, C.I. Pigment Red 4, C.I. Pigment Red 5, C.I. Pigment Red 12, C.I. Pigment Red 16, C.I. Pigment Red 17, C.I. Pigment Red 23, C.I. Pigment Red 31, C.I. Pigment Red 32, C.I. Pigment Red 41, C.I. Pigment Red 17, C.I. Pigment Red 48, C.I. Pigment Red 48:1, C.I. Pigment Red 48:2, C.I. Pigment Red 53:1, C.I. Pigment Red 57:1, C.I. Pigment Red 112, C.I. Pigment Red 144, C.I. Pigment Red 146, C.I. Pigment Red 150, C.I. Pigment Red 166, C.I. Pigment Red 170, C.I. Pigment Red 176, C.I. Pigment Red 185, C.I. Pigment Red 187, C.I. Pigment Red 208, C.I. Pigment Red 210, C.I. Pigment Red 220, C.I. Pigment Red 221, C.I. Pigment Red 238, C.I. Pigment Red 242, C.I. Pigment Red 245, C.I. Pigment Red 253, C.I. Pigment Red 258, C.I. Pigment Red 266, C.I. Pigment Red 269, C.I. Pigment Violet 13, C.I. Pigment Violet 25, C.I. Pigment Violet 32, C.I. Pigment Violet 50, C.I. Pigment Blue 25, C.I. Pigment Blue 26, C.I. Pigment Brown 23, C.I. Pigment Brown 25, C.I. Pigment Brown 41 and the like.

These pigments may be crude pigments and may be prepared pigment compositions insofar as the effects of the pigment dispersant of the invention are not remarkably impaired.

The mass composition ratio of the pigment and the pigment dispersant in the toner of the invention is suitably in the range of 100:1 to 100:100. The ratio is more suitably in the range of 100:5 to 100:50 in terms of pigment dispersibility.

As a colorant of the toner for use in the invention, the azo pigments mentioned above are always used. However, the pigments mentioned above and other colorants can be used in combination insofar as the dispersibility of the azo pigments is not impaired.

As colorants which can be used in combination, various substances, such as compounds typified by condensed azo compounds, isoindolinone compounds, anthraquinone compounds, azo metal complexes, methine compounds, ally-amide compounds, and the like are mentioned. Specifically, usable are C.I. Pigment Yellow 12, C.I. Pigment Yellow 13, C.I. Pigment Yellow 14, C.I. Pigment Yellow 15, C.I. Pigment Yellow 17, C.I. Pigment Yellow 62, C.I. Pigment Yellow 83, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 127, C.I. Pigment Yellow 129, C.I. Pigment Yellow 147, C.I. Pigment Yellow 151, C.I. Pigment Yellow 154, C.I. Pigment Yellow 168, C.I. Pigment Yellow 174, C.I. Pigment Yellow 176, C.I. Pigment Yellow 181, C.I. Pigment Yellow 185, C.I. Pigment Yellow 191, C.I. Pigment Yellow 194, C.I. Pigment Yellow 213, C.I. Pigment Yellow 214, C.I. Vat Yellow 1, 3, and 20, Mineral Fast Yellow, Navel Yellow, Naphthol Yellow S, Hansa Yellow G, Permanent Yellow NCG, C.I. Solvent Yellow 9, C.I. Solvent Yellow 17, C.I. Solvent Yellow 24, C.I. Solvent Yellow 31, C.I. Solvent Yellow 35, C.I. Solvent Yellow 58, C.I. Solvent Yellow 93, C.I. Solvent Yellow 100, C.I. Solvent Yellow 102, C.I. Solvent Yellow 103, C.I. Solvent Yellow 105, C.I. Solvent Yellow 112, C.I. Solvent Yellow 162, C.I. Solvent Yellow 163, and the like.

As the binder resin of the toner of the invention, a styrene-methacrylic acid copolymer, a styrene-acrylic acid copolymer, a polyester resin, an epoxy resin, a styrene-butadiene copolymer, and the like which are generally used are mentioned. In a method for directly obtaining toner particles by a polymerization method, monomers for forming them are used. Specifically, styrene monomers, such as styrene, α-methylstyrene, α-ethylstyrene, o-methylstyrene, m-methylstyrene, p-methylstyrene, o-ethylstyrene, m-ethylstyrene, and p-ethylstyrene, methacrylate monomers, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and amide methacrylate, acrylate monomers, such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and amide acrylate, and olefin monomers, such as butadiene, isoprene, and cyclohexene, are suitably used. These monomers are used singly or mixed as appropriate in such a manner that the theoretical glass transition temperature (Tg) is in the range of 40 to 75° C. [refer to "Polymer Handbook" edited by J. Brandrup, E. H. Immergut (U.S.), Third edition, John Wiley & Sons, 1989, p.p. 209 to 277]. When the theoretical glass transition temperature is lower than 40° C., problems are likely to arise in terms of the storage stability and durable stability of the toner. On the other hand, when the theoretical glass transition temperature exceeds 75° C., the transparency of the toner decreases in full color image formation. The binder resin in the toner of the invention can control a distribution in the toner of additives, such as a colorant, a charge control agent, and a wax, by the use of a nonpolar resin, such as polystyrene, and a polar resin, such as a polyester resin and a polycarbonate resin, in combination. For example, in the case of directly manufacturing toner particles by a suspension polymerization method or the like, the polar resin is added in a polymerization reaction from a dispersion process to a polymerization process. The polar resin is added according to the polarity balance of a polymerizable monomer composition formed into toner particles and an aqueous medium. As a result, the distribution in the toner can be controlled in such a manner that the resin concentration continuously changes from the toner particle surface towards the center, e.g., the polar resin forms a thin layer on the toner particle surface. In this case, a colorant can be present in the toner particles in a suitable manner by the use of a polar resin having an interaction with the compound having the azo skeleton unit described above, a colorant, and a charge control agent.

Furthermore, in the invention, a crosslinking agent can also be used in the synthesis of the binder resin in order to increase the mechanical strength of toner particles and also in order to control the molecular weight of the particle constituent molecules.

Mentioned as the crosslinking agents for use in the toner particle of the invention are bifunctional crosslinking agents, such as divinylbenzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, and diacrylates of polyethylene glycols #200, #400, and #600, dipropyrene glycol diacrylate, polypropylene glycol diacrylate, polyester type diacrylate, and substances in which theses diacrylates are substituted with dimethacrylates.

Mentioned as polyfunctional crosslinking agents are pentaerythritol triacrylate, trimethylolethane triacrylate, trimethylolpropane triacrylate, tetramethylolmethane tetraacrylate, origo ester acrylate and a methacrylate thereof, 2,2-bis(4-methacryloxyphenyl)propane, diallylphthalate, triallylcyanurate, triallylisocyanurate, and triallyltrimellitate.

These crosslinking agents are used suitably in the range of 0.05 to 10 parts by mass and more suitably 0.1 to 5 parts by mass based on 100 parts by mass of the above-described monomers in terms of the fixability and the offset resistance of the toner.

Furthermore, in the invention, wax components can also be used in the synthesis of the binder resin in order to prevent adhesion to a fixing member.

Mentioned as the wax components usable in the invention are, specically, petroleum waxes, such as paraffin wax, microcrystalline wax, and petrolatum, and derivatives thereof, montan wax and derivatives thereof, a hydrocarbon wax by Fischer-Tropsch process and derivatives thereof, a polyolefin wax typified by polyethylene and derivatives thereof, natural waxes, such as carnauba wax and candelilla wax, and derivatives thereof, and the like and the derivatives include oxides, block copolymers with vinyl monomers, and graft modified substances. Moreover, alcohols, such as higher aliphatic alcohol, fatty acids, such as stearic acid and pulmitic acid, fatty acid amide, fatty acid ester, hardened castor oil and derivatives thereof, plant waxes, and animal waxes are mentioned. These substances can be used singly or in combination.

As the addition amount of the wax components mentioned above, the content based on 100 parts by mass of the binder resin is suitably in the range of 2.5 to 15.0 parts by mass and more suitably 3.0 to 10.0 parts by mass in terms of the total amount.

In the toner of the invention, charge control agents can be mixed as required for use. Thus, the optimal frictional charge amount according to a development system can be controlled.

As the charge control agents, known substances can be used. In particular, a charge control agent which has high charge speed and can stably maintain a fixed charge amount is suitable. When manufacturing toner particles by a direct polymerization method, a charge control agent which has low polymerization inhibiting properties and substantially does not contain a soluble substance in an aqueous dispersion medium is suitable.

Mentioned as the charge control agents are, for example, as one which negatively charges a toner, a polymer or a copolymer having a sulfonic acid group, a sulfonate group, or a sulfonic acid ester group, a salicylic acid derivative and a metal complex thereof, a monoazo metallic compound, an acetyl acetone metallic compound, aromatic oxycarboxylic acid, aromatic mono- and poly-carboxylic acids, and metal salts, anhydrides, and esters thereof, phenol derivatives, such as bisphenol, a urea derivative, a metal-containing naphthoic acid compound, a boron compound, a quarternary ammonium salt, calixarene, a resin charge control agent, and the like. Mentioned as charge control agents which positively charge a toner are nigrosine, nigrosine modified by fatty acid metal salts or the like, a guanidine compound, an imidazole compound, quarternary ammonium salts, such as tributylbenzilammonium-1-hydroxy-4-naphthosulfonate and tetrabutylammonium tetrafluoroborate, onium salts, such as phosphonium salts which are analogs thereof and lake pigments thereof, triphenylmethane dyes and lake pigments thereof (Mentioned as laking agents are phosphotungstic acid, phosphomolybdic acid, phosphotungsten molybdic acid, tannic acid, lauric acid, gallic acid, ferricyanide, ferrocyanide, and the like), metal salts of higher fatty acids, diorgano tin oxides, such as dibutyl tin oxide, dioctyl tin oxide, and dicyclohexyl tin oxide, diorgano tin borates, such as dibutyl tin borate, dioctyl tin borate, and dicyclohexyl tin borate, resin charge control agents, and the like. These substances can be used singly or in combination of two or more kinds thereof.

In the toner of the invention, an inorganic fine powder may be added as a plasticizer to the toner particles. As the inorganic fine powder, fine powder, such as silica, titanium oxide, alumina or double oxides thereof, those obtained by surface treating them, can be used.

As a method for manufacturing the toner particles constituting the toner of the invention, a grinding method, a suspension polymerization method, a suspension granulation method, an emulsion polymerization method, and the like which are used heretofore are mentioned. From the viewpoint of the environmental load in manufacturing and the controllability of the particle diameter, it is suitable to obtain the toner particles particularly by a manufacturing method including granulating in an aqueous medium, such as a suspension polymerization method and a suspension granulation method, among the manufacturing methods mentioned above.

In the method for manufacturing the toner of the invention, the dispersibility of the pigment can be increased by mixing the compound having the azo skeleton unit and the pigment beforehand to prepare a pigment composition.

The pigment composition can be manufactured by a wet process or a dry process. Considering the fact that the compound having the azo skeleton unit has high affinity with a non-water soluble solvent, manufacturing by a wet process capable of simply manufacturing a uniform pigment composition is suitable. Specifically, the pigment composition is obtained as follows, for example. The compound having the azo skeleton unit and, as required, a resin are dissolved into a dispersion medium, and then pigment powder is gradually added under stirring to sufficiently mix the same with the dispersion medium. Furthermore, by applying mechanical shearing force by a dispersing machine, such as a ball mill, a paint shaker, a dissolver, an attritor, a sand mill, or a high speed mill, the pigment can be stably finely-dispersed into uniform fine particles.

The dispersion medium usable in the pigment composition is not particularly limited. In order to obtain a high pigment dispersion effect of the compound having the azo skeleton unit, the dispersion medium is suitably a non-water soluble solvent. Mentioned as the non-water soluble solvent are, specifically, esters, such as methyl acetate, ethyl acetate, and propyl acetate, hydrocarbons, such as hexane, octane, petroleum ether, cyclohexane, benzene, toluene, and xylene, halogen-containing hydrocarbons, such as carbon tetrachloride, trichloroethylene, and tetrabromoethane, and the like, for example.

The dispersion media usable in the pigment composition may be polymerizable monomers. Specifically, styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butyl styrene, p-n-hexyl styrene, p-n-octyl styrene, p-n-nonyl styrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methacrylic acid, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, acrylic acid, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthalene, acrylonitrile, methacrylonitrile, acryl amide, and the like can be mentioned.

As the resin usable in the pigment composition, resins usable as the binder resin of the toner of the invention can be used. Specifically, a styrene-methacrylic acid copolymer, a styrene-acrylic acid copolymer, a polyester resin, an epoxy resin, a styrene-butadiene copolymer, and the like are mentioned. The dispersion media can be used as a mixture of two or more kinds. The pigment composition can be isolated by known methods, such as filtration, decantation, or centrifugal separation. The solvent can also be removed by washing.

In the pigment composition, an auxiliary agent may be further added in manufacturing. Specifically, surfactants, dispersants, fillers, standardizers, resins, waxes, antifoaming agents, electrostatic prevention agents, dustproof agents, extenders, shading colorants, preservatives, dry inhibitors, rheology control additives, wetting agents, antioxidants, UV absorbents, photostabilizers, or combinations thereof are mentioned. The compound having the azo skeleton unit may be added beforehand in manufacturing a crude pigment.

The toner particles manufactured by the suspension polymerization method of the invention is manufactured as follows, for example. The pigment composition, the polymerizable monomer, the wax component, the polymerization initiator, and the like are mixed to thereby prepare a polymerizable monomer composition. Next, the polymerizable monomer composition is dispersed in an aqueous medium, and the particles of the polymerizable monomer composition are granulated. Then, the polymerizable monomers in the particles of the polymerizable monomer composition are polymerized in the aqueous medium to thereby obtain toner particles.

The polymerizable monomer composition in the above-described process is suitably one prepared by mixing a dispersion liquid in which the pigment composition is dissolved in a first polymerizable monomer with a second polymerizable monomer. More specifically, the pigment composition is sufficiently dispersed by the first polymerizable monomer, and then mixed with the second polymerizable monomer with other toner materials, whereby the pigment can be present in the toner particles in a more favorable dispersion state.

As the polymerization initiator for use in the above-described suspension polymerization method, known polymerization initiators can be mentioned. For example, azo compounds, organic peroxides, inorganic peroxides, organic metallic compounds, photopolymerization initiators, and the like are mentioned. More specifically, initiators, such as azo polymerization initiators, such as 2,2'-azobis(isobutyronitrile), 2,2'-azobis(2-methyl butyronitrile), 2,2'-azobis(4-methoxy-2,4-dimethylvaleronitrile), 2,2'-azobis(2,4-dimethylvaleronitrile), and dimethyl 2,2'-azobis(isobutyrate), organic peroxide polymerization initiators, such as benzoyl peroxide, di-tert-butyl peroxide, tert-butylperoxyisopropyl monocarbonate, tert-hexylperoxybenzoate, and tert-butylperoxybenzoate, inorganic peroxide polymerization initiators, such as potassium peroxodisulfate and ammonium persulfate, a hydrogen peroxide-ferrous iron type, a BPO-dimethylaniline type, and a cerium (IV) salt-alcohol type, and the like are mentioned. As the photopolymerization initiators, acetophenones, benzoin ethers, ketals, and the like are mentioned. These methods can be used singly or in combination of two or more of the methods.

The concentration of the polymerization initiator is suitably in the range of 0.1 to 20 parts by mass and more suitably 0.1 to 10 parts by mass relative to 100 parts by mass of the polymerizable monomer. The type of the polymerizable initiators slightly varies depending on the polymerization method. The polymerizable initiators are used singly or as a mixture referring to a 10-hour half-life temperature.

In the aqueous medium for use in the suspension polymerization method, it is suitable to compound a dispersion stabilizer. As the dispersion stabilizer, known inorganic and organic dispersion stabilizers can be used. Mentioned as the inorganic dispersion stabilizers are, for example, calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, alumina, and the like. Mentioned as the organic dispersion stabilizers are, for example, sodium salts of polyvinyl alcohol, gelatin, methyl cellulose, methyl hydroxypropyl cellulose, ethyl cellulose, and carboxymethyl cellulose, starches, and the like. Moreover, nonionic, anionic, cationic surfactants can also be utilized. For example, dodecyl sodium sulfate, sodium tetradecyl sulfate, pentadecyl sodium sulfate, octyl sodium sulfate, sodium oleate, sodium laurate, potassium stearate, calcium oleate, and the like are mentioned.

Among the dispersion stabilizers mentioned above, it is suitable to use poor water-soluble inorganic dispersion stabilizers which are soluble in acid in the invention. In the invention, when preparing the aqueous dispersion medium using poor water-soluble inorganic dispersion stabilizers, it is suitable to use these dispersion stabilizers in such a manner that the proportion thereof is in the range of 0.2 to 2.0 parts by mass relative to 100 parts by mass of the polymerizable monomer in terms of the stability of liquid droplets in the aqueous medium of the polymerizable monomer composition. In the invention, it is suitable to prepare the aqueous medium using water in the range of 300 to 3000 parts by mass relative to 100 parts by mass of the polymerizable monomer composition.

In the invention, when preparing the aqueous medium in which the poor water-soluble inorganic dispersion stabilizer is dispersed, a commercially-available dispersion stabilizer as it is may be dispersed. However, in order to obtain dispersion stabilizer particles having a fine uniform particle size, it is suitable to prepare the aqueous medium by generating the poor water-soluble inorganic dispersion stabilizer under high-speed stirring in water. For example, when using calcium phosphate as a dispersion stabilizer, a suitable dispersion stabilizer can be obtained by mixing an aqueous sodium phosphate solution and an aqueous calcium chloride solution under high-speed stirring to form calcium phosphate fine particles.

With respect to the toner particles, suitable toner particles can be obtained also when manufactured by a suspension granulation method. Since the manufacturing process of the suspension granulation method does not include a heating process, compatibilization of the resin and the wax component occurring when a low melting point wax is used can be suppressed and a reduction in the glass transition temperature of the toner resulting from the compatibilization can be prevented. In the suspension granulation method, various kinds of toner materials serving as the binder resin are used and it is easy to use a polyester resin which is generally advantageous in fixability as the main ingredient. Therefore, when manufacturing a toner of a resin composition to which the suspension polymerization method cannot be applied, the suspension polymerization method is an advantageous manufacturing method.

Mentioned as the solvents usable in the suspension granulation method are, for example, hydrocarbons, such as toluene, xylene, and hexane, halogen-containing hydrocarbons, such as methylene chloride, chloroform, dichloroethane, trichloroethane, and carbon tetrachloride, alcohols, such as methanol, ethanol, butanol, and isopropyl alcohol, polyhydric alcohols, such as ethylene glycol, propylene glycol, diethylene glycol, and triethylene glycol, cellosolves, such as methyl cellosolve and ethyl cellosolve, ketones, such as acetone, methyl ethyl ketone, and methyl isobutyl ketone, ethers, such as benzyl alcohol ethyl ether, benzyl alcohol isopropyl ether, and tetrahydrofuran, and esters, such as methyl acetate, ethyl acetate, and butyl acetate. These solvents can be used singly or as a mixture of two or more kinds. Among the solvents mentioned above, in order to easily remove the solvent in the toner particle suspension liquid, it is suitable to use a solvent whose boiling point is low and which can sufficiently dissolve the binder resin.

The use amount of the solvent is suitably in the range of 50 to 5000 parts by mass and more suitably 120 to 1000 parts by mass relative to 100 parts by mass of the binder resin.

The toner particles manufactured by the suspension granulation method are manufactured as follows, for example. First, the pigment composition, the binder resin, the wax component, and the like are mixed in a solvent to prepare a solvent composition. Next, the solvent composition is dispersed in an aqueous medium to granulate particles of the solvent composition, thereby obtaining a toner particle suspension liquid. Then, the obtained suspension liquid is heated or decompressed to remove the solvent, whereby the toner particles can be obtained.

The solvent composition in the above-described process is suitably prepared by mixing a dispersion liquid in which the pigment composition is dissolved in a first solvent with a second solvent. More specifically, the pigment composition is sufficiently dispersed by the first solvent, and then mixed with the second solvent with other toner materials, whereby the pigment can be present in the toner particles in a more favorable dispersion state.

In the aqueous medium for use in the suspension granulation method, a dispersion stabilizer is suitably compounded. As the dispersion stabilizer, known inorganic and organic dispersion stabilizers can be used. Mentioned as the inorganic dispersion stabilizers are, for example, calcium phosphate, calcium carbonate, aluminum hydroxide, calcium sulfate, barium carbonate, and the like. Mentioned as the organic dispersion stabilizers are, for example, water-soluble polymers, such as sodium salts of polyvinyl alcohol, methyl cellulose, hydroxyethyl cellulose, ethyl cellulose, and carboxymethyl cellulose, sodium polyacrylate, and sodium polymethacrylate, surfactants, such as anionic surfactants, such as sodium dodecylbenzenesulfonate, octadecyl sodium sulfate, sodium oleate, sodium laurate, and potassium stearate, cationic surfactants, such as lauryl amine acetate, stearyl amine acetate, and lauryl trimethyl ammonium chloride, amphoteric ionic surfactants, such as lauryl dimethylamine oxide, nonionic surfactants, such as polyoxyethylene alkyl ether, polyoxyethylene alkyl phenyl ether, and polyoxyethylene alkyl amine, and the like.

The use amount of the dispersant is suitably in the range of 0.01 to 20 parts by mass relative to 100 parts by mass of the binder resin in terms of the stability of liquid droplets in the aqueous medium of the solvent composition.

In the invention, the weight average particle diameter (hereinafter referred to as D4) of the toner is suitably in the range of 3.0 to 15.0 µm and more suitably 4.0 to 12.0 µm from the viewpoint of obtaining high definition images.

The ratio of D4 and the number average particle diameter (hereinafter referred to as D1) of the toner (hereinafter referred to as D4/D1) is suitably 1.35 or lower and more suitably 1.30 or lower.

The adjustment methods of D4 and D1 of the toner of the invention vary depending on the manufacturing methods for the toner particles. For example, in the case of the suspension polymerization method, D1 and D4 can be adjusted by controlling the concentration of the dispersant for use in the preparation of the aqueous dispersion medium, the reaction stirring speed, the reaction stirring time, or the like.

The toner of the invention may be either a magnetic toner or a nonmagnetic toner. When used as a magnetic toner, a magnetic substance containing a magnetic material may be mixed in the toner particles constituting the toner of the invention. Mentioned as such a magnetic material, are iron oxides, such as magnetite, maghemite, and ferrite, or iron oxides containing the other metal oxides, metals, such as Fe, Co, and Ni, or alloys of these metals and metals, such as Al, Co, Cu, Pb, Mg, Ni, Sn, Zn, Sb, Be, Bi, Cd, Ca, Mn, Se, Ti, W, and V, mixtures thereof, and the like.

In the magnetic substance, it is suitable in terms of the developability of the toner that the average particle diameter is suitably 0.1 to 2 µm and more suitably 0.1 to 0.3 µm and, with respect to the magnetic properties in the application of 795.8 kA/m, the coercive force is 1.6 to 12 kA/m, the saturation magnetization is 5 to 200 $Am^2/kg$ (suitably 50 to 100 $Am^2/kg$), and the residual magnetization is 2 to 20 $Am^2/kg$.

With respect to the addition amount of these magnetic materials, the magnetic materials are used in the proportion of suitably 10 to 200 parts by mass and more suitably 20 to 150 parts by mass relative to 100 parts by mass of the binder resin.

EXAMPLES

Hereinafter, the invention is described in more detail with reference to Examples and Comparative Examples but is not limited to the following Examples without departing from the scope of the invention. In the following description, "part(s)" and "%" are based on mass unless otherwise particularly specified.

Measurement methods used in the examples are described.

(1) Molecular Weight Measurement

The molecular weight of the high molecular weight polymer unit and the azo compound is calculated in terms of polystyrene by size exclusion chromatography (SEC). The measurement of the molecular weight by SEC was performed as described below.

One obtained by filtering a solution, which was obtained by adding a sample to the following eluate in such a manner that the sample concentration was 1.0%, and then leaving the mixture to stand still at room temperature for 24 hours, thorough a solvent resistant membrane filter having a pore diameter of 0.2 μm was used as a sample solution, and was measured under the following conditions.

Apparatus: High-speed GPC apparatus "HLC-8220GPC [manufactured by TOSOH CORP.]
  Column: Two units of LF-804
  Eluate: THF
  Flow velocity: 1.0 mL/min
  Oven temperature: 40° C.
  Sample injection amount: 0.025 ml In calculation of the molecular weight of the sample, the calibration curves produced from standard polystyrene resins [TSK standard polystyrenes F-850, F-450, F-288, F-128, F-80, F-40, F-20, F-10, F-4, F-2, F-1, A-5000, A-2500, A-1000, and A-500 manufactured by TOSOH CORP.] were used.

(2) Acid Value Measurement

The acid value of the high molecular weight polymer unit and the azo compound is determined by the following method.

The basic operation is based on JIS K-0070.
1) 0.5 to 2.0 g of the sample is accurately weighed. The mass at this time is defined as W (g).
2) The sample is put in a 50 mL beaker, and then 25 mL of a mixed liquid of tetrahydrofuran/ethanol (2/1) is added and dissolved.
3) Titration is performed using an ethanol solution of 0.1 mol/L of KOH and using a potentiometric titration meter [For example, automatic titration meter "COM-2500" manufactured by Hiranuma Sangyo Co., Ltd. or the like can be used.].
4) The use amount of the KOH solution at this time is defined as S (mL). The blank is simultaneously measured and the use amount of KOH at this time is defined as B (mL).
5) The acid value is calculated by the following expression. f represents the factor of the KOH solution.

$$\text{Acid value [mgKOH/g]} = \frac{(S-B) \times f \times 5.61}{W}$$

(3) Composition Analysis

The structural determination of the high molecular weight polymer unit and the azo compound was performed using the following apparatus.

$^1$H NMR: ECA-400 manufactured by JEOL Co., Ltd. (Used solvent: deuterochloroform)

Example 1

The azo compound represented by Formula (1) or (4) above was obtained by the following method.

Manufacturing Example of Compound (46)

A compound (46) having the azo skeleton unit represented by the following structure was manufactured according to the following scheme.

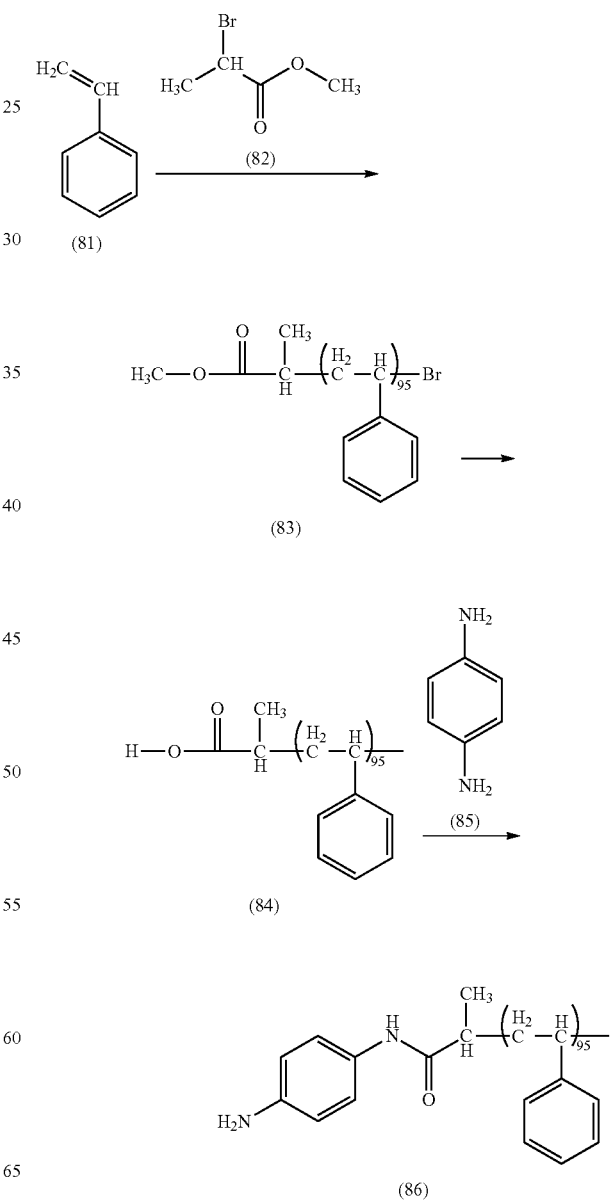

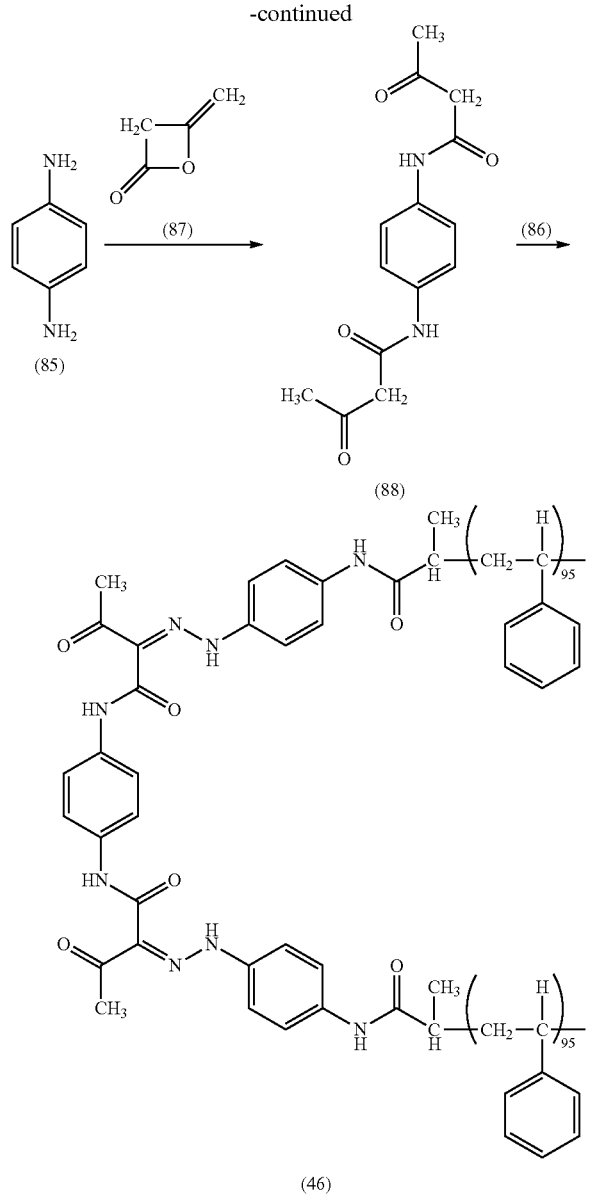

First, 60.0 parts of styrene (81), 1.47 parts of N,N,N',N",N"-pentamethyl diethylene triamine, and 0.493 part of copper bromide (I) were added to 0.395 part of methyl 2-bromopropionate (82), and then the mixture was stirred at 100° C. under a nitrogen gas atmosphere for 5 hours. After the completion of the reaction, the mixture was extracted with chloroform, and then purified by reprecipitation with methanol, thereby obtaining 52.4 parts of a compound (83) (Yield of 81.9%).

Next, 1.00 part of the compound (83) was added to 150 parts of dioxane, the mixture was stirred at 110° C., a mixture of 5.00 parts of concentrated hydrochloric acid and 30 parts of dioxane was added, and then the mixture was stirred at 110° C. under a nitrogen gas atmosphere for 5 hours. After the completion of the reaction, the mixture was extracted with chloroform, and purified by reprecipitation with methanol, thereby obtaining 0.98 part of a compound (84) (Yield of 98.0%).

Next, 1.00 part of the compound (84) and 0.0160 part of oxalyl chloride were added to 5.00 parts of chloroform, and then the mixture was stirred at room temperature under a nitrogen gas atmosphere for 5 hours. One in which 0.0670 part of p-phenylene diamine (85) was dissolved in 10.0 parts of chloroform and 5.00 parts of N,N-dimethylformamide was added dropwise to the solution, and then the mixture was stirred at 60° C. under a nitrogen gas atmosphere for 2 hours. After the completion of the reaction, the mixture was separated with chloroform/water, concentrated, and then purified by reprecipitation with methanol, thereby obtaining 0.970 part of a compound (86) (Yield of 97.0%).

Next, 50.0 parts of p-phenylene diamine (85) and 35.0 parts of acetone were added to 300 parts of chloroform, the mixture was ice-cooled to 10° C. or lower, and 72.0 parts of diketene (87) was added. Then, the mixture was stirred at 65° C. for 2 hours. After the completion of the reaction, the mixture was extracted with chloroform and condensed, thereby obtaining 121 parts of a compound (88) (Yield of 97.4%).

Next, 40.0 parts of THF and 0.127 part of concentrated hydrochloric acid were added to 4.00 parts of the compound (86), and then the mixture was ice-cooled to 10° C. or lower. One in which 0.005 part of sodium nitrite was dissolved in 1.70 parts of water was added to the solution, and then allowed to react at the same temperature for 1 hour.

Subsequently, 0.0320 part of sulfamic acid was added, and then the mixture was further stirred for 20 minutes (diazonium salt solution). One in which 0.230 part of potassium acetate was dissolved in 1.00 part of water and 0.0460 part of the compound (88) were added to 70.0 parts of methanol, the mixture was ice-cooled to 10° C. or lower, the diazonium salt solution was added, and then the mixture was allowed to react at 10° C. or lower for 2 hours. After the completion of the reaction, 300 parts of water was added, the mixture was stirred for 30 minutes, and then the solid was separated by filtration, followed by purification by reprecipitation with methanol, thereby obtaining 3.80 parts of a compound (46) (Yield of 95.0%).

[Analysis Results of Compound (46) Having Azo Skeleton Unit]
[1] Molecular weight measurement (GPC) results:
Weight average molecular weight (Mw)=31686
Number average molecular weight (Mn)=22633
[2] Acid value measurement results:
0 mgKOH/g
[3] $^1$H NMR (400 MHz, CDCl$_3$, room temperature) results (refer to FIG. 1): δ [ppm]=14.78 (s, 2H), 11.50 (s, 2H), 7.63 (d, 4H), 7.29-6.37 (m, 1192H), 2.56 (s, 6H), 2.18-0.99 (m, 839H).

Manufacturing Example of Compound (31)

A compound (31) was synthesized by performing the same operation as that of the manufacturing example of the compound (46), except changing the compound (85) to m-phenylene diamine
[Analysis results of compound (31) having azo skeleton unit]
[1] Molecular weight measurement (GPC) results:
Weight average molecular weight (Mw)=32564
Number average molecular weight (Mn)=23025
[2] Acid value measurement results:
0 mgKOH/g
[3] $^1$H NMR (400 MHz, CDCl$_3$, room temperature) results:
δ [ppm]=14.80 (s, 2H), 11.48 (s, 2H), 7.60 (d, 4H), 7.32-6.35 (m, 1194H), 2.59 (s, 6H), 2.20-0.95 (m, 841H)

Manufacturing Example of Compound (78)

A compound (78) having the azo skeleton unit represented by the following structure was manufactured according to the following scheme.

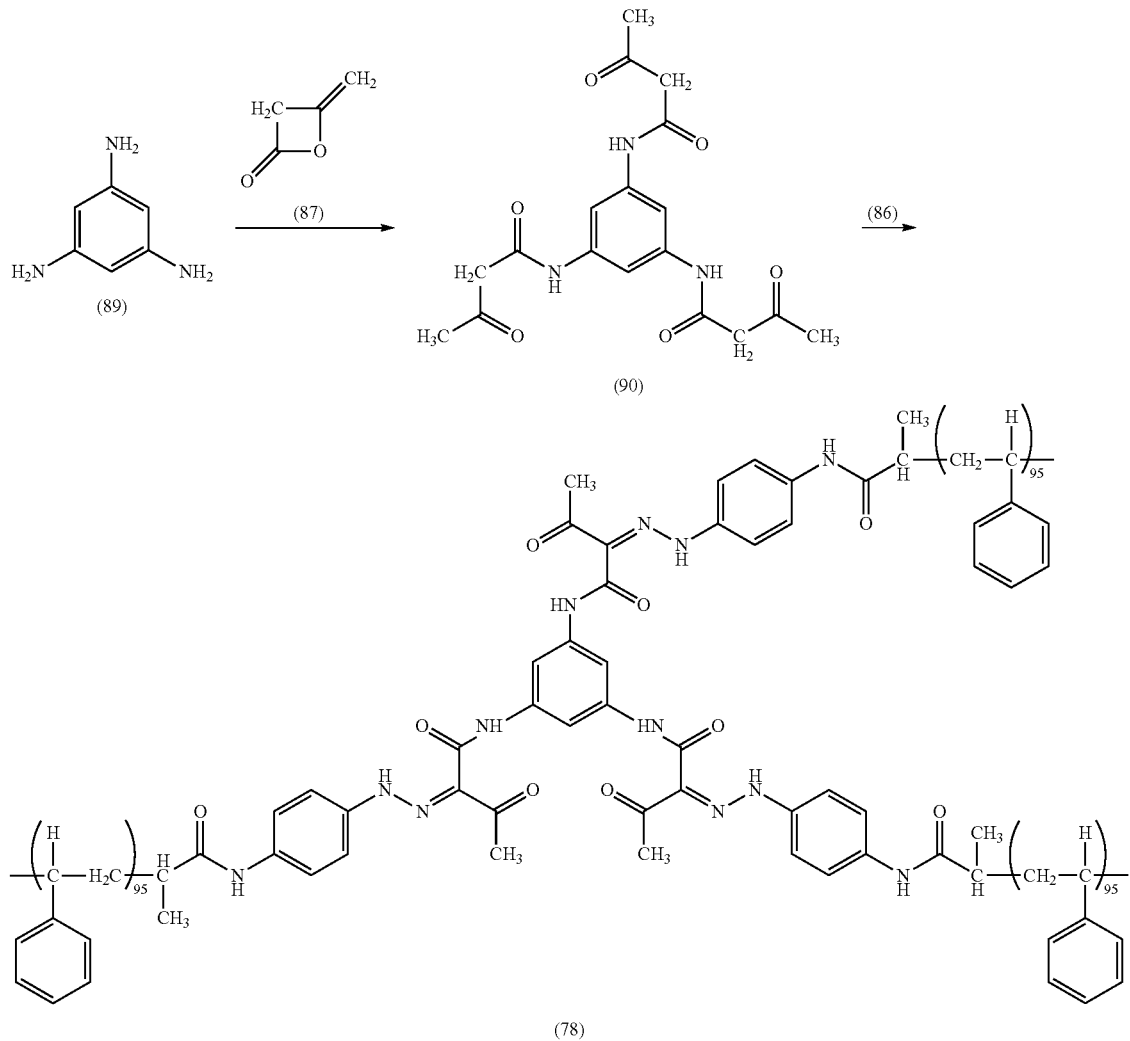

First, a compound (86) was obtained by the same operation as that of the manufacturing example of the compound (46).

Next, 0.500 part of 1,3,5-triaminobenzene (89) and 0.345 part of triethylamine were added to 10.0 parts of N,N-dimethylformamide, and then the mixture was stirred at room temperature. Next, 0.949 part of diketene (87) was added, and then the mixture was stirred at 50° C. for 2 hours. After the completion of the reaction, 300 parts of water was added, the mixture was stirred for 30 minutes, and then the solid was separated by filtration, thereby obtaining 1.41 parts of a compound (90) (Yield of 92.8%).

Next, 20 parts of DMF, 20.0 parts of THF, and 0.130 part of concentrated hydrochloric acid were added to 4.00 parts of the compound (86), and then the mixture was ice-cooled to 10° C. or lower. One in which 0.0450 part of sodium nitrite was dissolved in 0.136 part of water was added to this solution, and then the mixture was allowed to react at the same temperature for 1 hour. Subsequently, 0.0320 part of sulfamic acid was added, and then the mixture was further stirred for 20 minutes (diazonium salt solution). One in which 0.225 part of potassium acetate was dissolved in 1.00 part of water and 0.0440 part of the compound (75) were added to 15.0 parts of DMF, the mixture was ice-cooled to 10° C. or lower, the diazonium salt solution was added, and then the mixture was allowed to react at 10° C. or lower for 2 hours. After the completion of the reaction, 300 parts of water was added, the mixture was stirred for 30 minutes, and then the solid was separated by filtration and purified by a recrystallization method from N,N-dimethylformamide, thereby obtaining 3.78 parts of a compound (78) (Yield of 94.5%).

Figure 2:
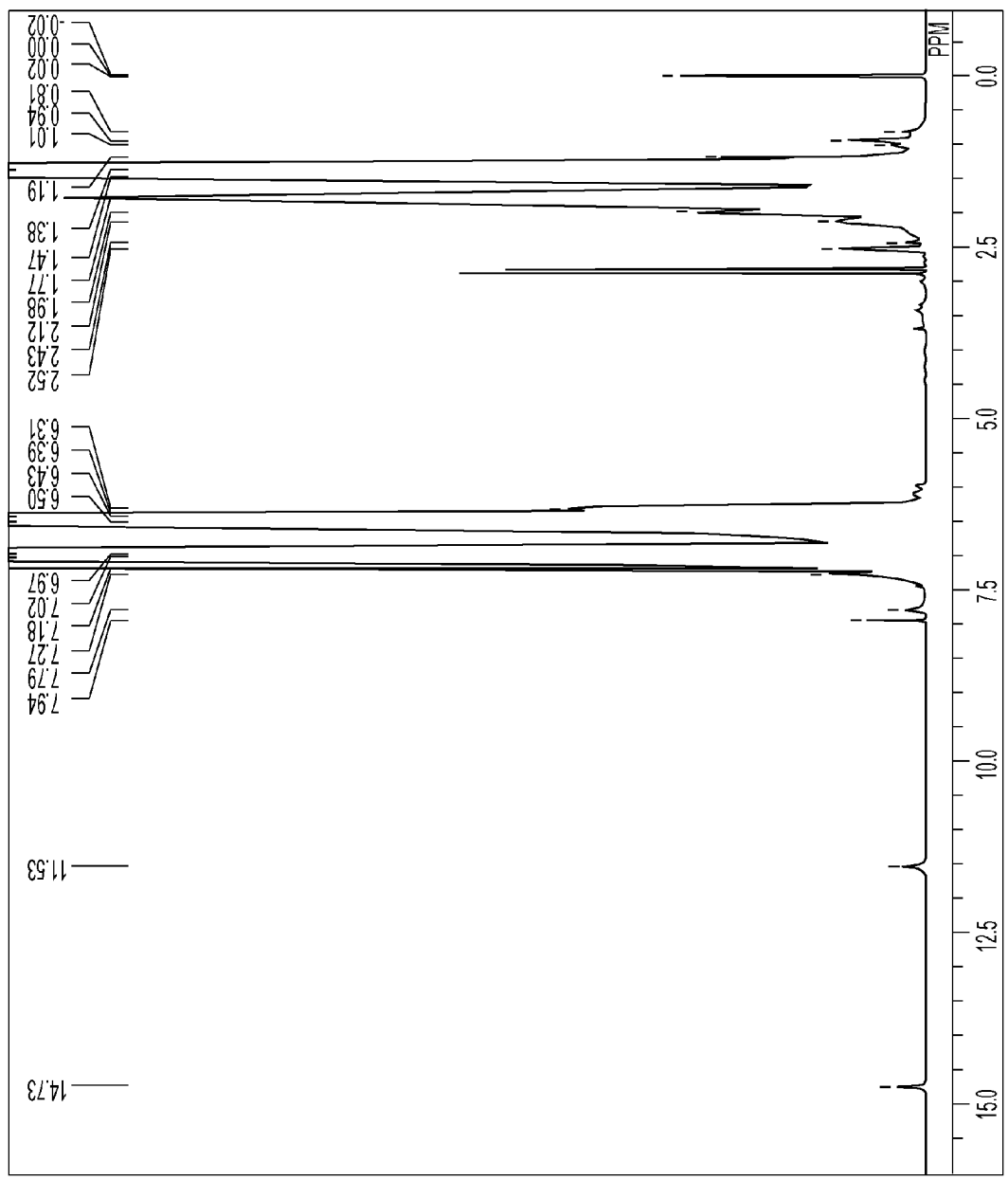
FIG. 2 is a view illustrating the $^1$H NMR spectrum at room temperature and at 400 MHz in CDCl$_3$ of a compound (78) having an azo skeleton unit of the invention.

[Analysis results of compound (78) having azo skeleton unit]
[1] Molecular weight measurement (GPC) results:
Weight average molecular weight (Mw)=48989
Number average molecular weight (Mn)=28481
[2] Acid value measurement results:
0 mgKOH/g
[3] $^1$H NMR (400 MHz, CDCl$_3$, room temperature) results (refer to FIG. 2): δ [ppm]=14.73 (s, 3H), 11.53 (s, 3H), 7.79 (s, 3H), 7.27-6.31 (m, 2175H), 2.52 (s, 9H), 2.12-0.81 (m, 1461H).

Compounds having the azo skeleton unit (16) to (30), (32) to (45), (47) to (77), and (79) to (80) were manufactured by the same operation as that of the manufacturing examples of the compounds having the azo skeleton unit (31), (46), and (78).

The following table 1 shows the high molecular weight polymer units.

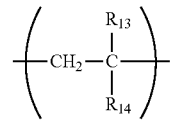
[Chem. Z]

TABLE 1

| Polymer resin units | | | | | | | | | |
|---|---|---|---|---|---|---|---|---|---|
| Polymer resin unit No. | Sequential arrangement of monomer | Number of X | Number of Y | Number of Z | $R_{10}$ | $R_{11}$ | $R_{12}$ | $R_{13}$ | $R_{14}$ |
| R-1 | α-V-polyX | 95 | 0 | 0 | H | — | — | — | — |
| R-2 | α-V-polyX | 150 | 0 | 0 | H | — | — | — | — |
| R-3 | α-V-polyY | 0 | 96 | 0 | — | H | COO—$CH_3$ | — | — |
| R-4 | α-W-polyX | 94 | 0 | 0 | H | — | — | — | — |
| R-5 | α-W-polyX | 140 | 0 | 0 | H | — | — | — | — |
| R-6 | α-V-poly(X-co-Y) | 74 | 18 | 0 | H | H | COO—$CH_3$ | — | — |
| R-7 | α-V-poly(X-co-Y) | 20 | 88 | 0 | H | H | COO—$CH_3$ | — | — |
| R-8 | α-V-poly(X-co-Y) | 77 | 19 | 0 | H | H | $CONH_2$ | — | — |
| R-9 | α-V-poly(X-co-Y) | 80 | 20 | 0 | H | H | COO—$CH_3$ | — | — |
| R-10 | α-V-poly(X-co-Y) | 75 | 19 | 0 | H | H | COO—Bn | — | — |
| R-11 | α-V-poly(X-co-Y) | 57 | 5 | 0 | H | H | COO—$(CH_2)_7CH_3$(n) | — | — |
| R-12 | α-V-poly(X-co-Y) | 49 | 4 | 0 | H | H | COO—$(CH_2)_{17}CH_3$(n) | — | — |
| R-13 | α-V-poly(X-co-Y) | 58 | 3 | 0 | H | H | COO—$(CH_2)_{21}CH_3$(n) | — | — |
| R-14 | α-V-poly(X-co-Y-co-Z) | 75 | 13 | 3 | H | H | COO—$CH_3$ | H | COO—$(CH_2)_{21}CH_3$(n) |
| R-15 | α-V-poly(X-co-Y-co-Z) | 59 | 28 | 4 | H | H | COO—$(CH_2)_3CH_3$(n) | H | COO—$(CH_2)_{21}CH_3$(n) |

In Table 1, the prefix α represents a terminal group attached to the left of the unit X or the unit Y. V represents a —R—COOH group, W represents a —R—OH group, and X, Y, and Z represent the following structures.

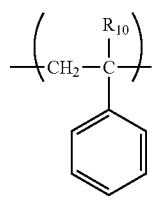
[Chem. X]

In Formula (X), $R_{10}$ represents a hydrogen atom or an alkyl group.

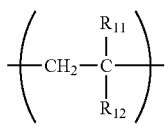
[Chem. Y]

In Formula (Y), $R_{11}$ represents a hydrogen atom or an alkyl group and $R_{12}$ represents a carboxylic acid ester group or a carboxylic acid amide group.

In Formula (Z), $R_{13}$ represents a hydrogen atom or an alkyl group and $R_{14}$ represents a carboxylic acid ester group or a carboxylic acid amide group.

For example, R-1 has a structure in which 95 units X are repeated and a COOH group is bonded to one terminal thereof (at the side of the carbon to which a phenyl group is bonded) through an R group. R-9 has a structure in which 80 units having the structure of X and 20 units having the structure of Y are bonded at random and a COOH group is bonded to one terminal thereof (at the side of the carbon to which a phenyl group is bonded or at the side of the carbon to which $R_{11}$ and $R_{12}$ are bonded) through an R group. "Bn" represents an unsubstituted benzyl group. The R group is described in the description of the linking group below.

The following tables 2-1 to 2-2 show the structures of the compounds having the azo skeleton unit. m, n, and $R_1$ to $R_7$ in Tables 2-1 to 2-2 are based on the following general Formula (1).

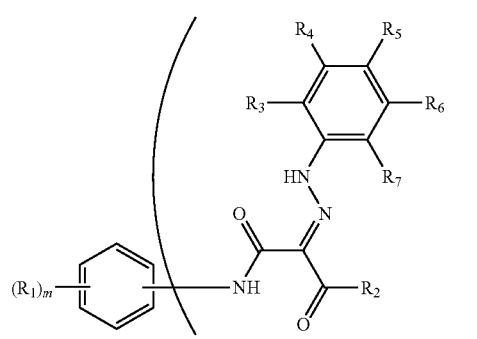
[Chem. 1]

TABLE 2-1

Compounds having azo skeleton unit

| Compound | Polymer resin unit | m | n | Substituent position of acetoacetamide groups | $R_1$ | $R_2$ | $R_3$ | $R_4$ | $R_5$ | $R_6$ | $R_7$ |
|---|---|---|---|---|---|---|---|---|---|---|---|
| 16 | R-1 | 4 | 2 | 1,4- | H | $CH_3$ | $L_1$ | H | H | H | H |
| 17 | R-2 | 4 | 2 | 1,4- | H | $CH_3$ | $L_1$ | H | CN | H | H |
| 18 | R-3 | 4 | 2 | 1,4- | H | $CH_3$ | $L_1$ | H | H | H | H |
| 19 | R-4 | 4 | 2 | 1,4- | H | $CH_3$ | $L_4$ | H | H | H | H |
| 20 | R-5 | 4 | 2 | 1,4- | H | $CH_3$ | $L_4$ | H | H | H | H |
| 21 | R-6 | 4 | 2 | 1,4- | H | $CH_3$ | H | $L_2$ | H | H | H |
| 22 | R-7 | 4 | 2 | 1,4- | H | $CH_3$ | H | $L_2$ | H | H | H |
| 23 | R-8 | 4 | 2 | 1,4- | H | $CH_3$ | H | $L_2$ | H | $OCH_3$ | H |
| 24 | R-9 | 4 | 2 | 1,4- | H | $CH_3$ | H | $L_2$ | H | H | H |
| 25 | R-10 | 4 | 2 | 1,4- | H | $CH_3$ | H | $L_2$ | H | H | H |
| 26 | R-11 | 4 | 2 | 1,4- | H | $CH_3$ | H | $L_2$ | H | H | H |
| 27 | R-12 | 4 | 2 | 1,4- | H | $CH_3$ | H | $L_2$ | H | H | H |
| 28 | R-13 | 4 | 2 | 1,4- | H | $CH_3$ | H | $L_2$ | H | H | H |
| 29 | R-14 | 4 | 2 | 1,4- | H | $CH_3$ | H | $L_2$ | H | H | H |
| 30 | R-15 | 4 | 2 | 1,4- | H | $CH_3$ | H | $L_2$ | H | H | H |
| 31 | R-1 | 4 | 2 | 1,4- | H | $CH_3$ | H | $L_1$ | H | H | H |
| 32 | R-2 | 4 | 2 | 1,4- | H | $CH_3$ | H | $L_1$ | H | H | H |
| 33 | R-3 | 4 | 2 | 1,4- | H | $CH_3$ | H | $L_1$ | H | Cl | H |
| 34 | R-4 | 4 | 2 | 1,4- | H | $CH_3$ | H | $L_4$ | H | H | H |
| 35 | R-5 | 4 | 2 | 1,4- | H | $CH_3$ | H | $L_4$ | H | H | H |
| 36 | R-6 | 4 | 2 | 1,4- | H | $CH_3$ | H | H | $L_3$ | H | H |
| 37 | R-7 | 4 | 2 | 1,4- | H | Ph | H | H | $L_3$ | H | H |
| 38 | R-8 | 4 | 2 | 1,4- | H | $CH_3$ | H | H | $L_3$ | H | H |
| 39 | R-9 | 4 | 2 | 1,4- | H | $CH_3$ | H | H | $L_3$ | H | H |
| 40 | R-10 | 4 | 2 | 1,4- | H | $CH_3$ | H | H | $L_3$ | H | H |
| 41 | R-11 | 4 | 2 | 1,4- | H | $CH_3$ | H | H | $L_3$ | H | H |
| 42 | R-12 | 4 | 2 | 1,4- | H | $CH_3$ | H | H | $L_3$ | H | H |
| 43 | R-13 | 4 | 2 | 1,4- | H | $CH_3$ | H | H | $L_3$ | H | H |
| 44 | R-14 | 4 | 2 | 1,4- | H | $CH_3$ | H | H | $L_3$ | H | H |
| 45 | R-15 | 4 | 2 | 1,4- | H | $CH_3$ | H | H | $L_3$ | H | H |
| 46 | R-1 | 4 | 2 | 1,4- | H | $CH_3$ | H | H | $L_1$ | H | H |
| 47 | R-2 | 4 | 2 | 1,4- | H | $NH_2$ | H | H | $L_1$ | H | H |
| 48 | R-3 | 4 | 2 | 1,4- | H | $CH_3$ | H | H | $L_1$ | H | H |
| 49 | R-4 | 4 | 2 | 1,4- | H | $CH_3$ | H | H | $L_4$ | H | H |
| 50 | R-5 | 4 | 2 | 1,4- | H | $CH_3$ | H | H | $L_4$ | H | H |

TABLE 2-2

Compounds having azo skeleton unit

| Compound | Polymer resin unit | m | n | Substituent position of acetoacetamide groups | $R_1$ | $R_2$ | $R_3$ | $R_4$ | $R_5$ | $R_6$ | $R_7$ |
|---|---|---|---|---|---|---|---|---|---|---|---|
| 51 | R-6 | 4 | 2 | 1,4- | H | $CH_3$ | H | H | $L_1$ | H | H |
| 52 | R-7 | 4 | 2 | 1,4- | H | $CH_3$ | H | H | $L_1$ | H | H |
| 53 | R-8 | 4 | 2 | 1,4- | H | $CH_3$ | H | H | $L_1$ | H | H |
| 54 | R-9 | 4 | 2 | 1,4- | H | $CH_3$ | H | H | $L_1$ | H | H |
| 55 | R-10 | 4 | 2 | 1,4- | H | $CH_3$ | H | H | $L_1$ | H | H |
| 56 | R-11 | 4 | 2 | 1,4- | H | $CH_3$ | H | H | $L_1$ | H | H |
| 57 | R-12 | 4 | 2 | 1,4- | H | $CH_3$ | H | H | $L_1$ | H | H |
| 58 | R-13 | 4 | 2 | 1,4- | H | $CH_3$ | H | H | $L_1$ | H | H |
| 59 | R-14 | 4 | 2 | 1,4- | H | $CH_3$ | H | H | $L_1$ | H | H |
| 60 | R-15 | 4 | 2 | 1,4- | H | $CH_3$ | H | H | $L_1$ | H | H |
| 61 | R-4 | 4 | 2 | 1,4- | H | t-Bu | H | $L_4$ | H | H | H |
| 62 | R-4 | 4 | 2 | 1,4- | H | t-Bu | H | $L_4$ | H | H | H |
| 63 | R-4 | 4 | 2 | 1,3- | H | $CH_3$ | $L_4$ | H | H | H | H |
| 64 | R-4 | 4 | 2 | 1,3- | H | $CH_3$ | H | $L_4$ | H | H | H |
| 65 | R-4 | 4 | 2 | 1,3- | H | $CH_3$ | H | H | $L_4$ | H | H |
| 66 | R-1 | 4 | 2 | 1,4- | 2-$OCH_3$ | $CH_3$ | H | H | $L_1$ | H | H |
| 67 | R-1 | 4 | 2 | 1,4- | 2-$CF_3$ | $CH_3$ | H | H | $L_1$ | H | H |
| 68 | R-1 | 4 | 2 | 1,4- | 2-CN | $CH_3$ | H | H | $L_1$ | H | H |
| 69 | R-1 | 4 | 2 | 1,3- | 5-$CH_3$ | $CH_3$ | H | $L_3$ | H | H | H |
| 70 | R-1 | 4 | 2 | 1,3- | H | $CH_3$ | H | H | $L_3$ | H | H |
| 71 | R-1 | 4 | 2 | 1,3- | H | $CH_3$ | $L_1$ | H | H | H | H |
| 72 | R-1 | 4 | 2 | 1,3- | H | $CH_3$ | H | $L_1$ | H | H | H |
| 73 | R-1 | 4 | 2 | 1,3- | H | $CH_3$ | H | H | $L_1$ | H | H |
| 74 | R-1 | 4 | 2 | 1,2- | H | $CH_3$ | H | H | $L_1$ | H | H |

TABLE 2-2-continued

Compounds having azo skeleton unit

| Compound | Polymer resin unit | m | n | Substituent position of acetoacetamide groups | $R_1$ | $R_2$ | $R_3$ | $R_4$ | $R_5$ | $R_6$ | $R_7$ |
|---|---|---|---|---|---|---|---|---|---|---|---|
| 75 | R-1 | 4 | 2 | 1,2- | H | $CH_3$ | H | H | $L_1$ | H | H |
| 76 | R-1 | 3 | 3 | 1,3,5- | H | $CH_3$ | $L_1$ | H | H | H | H |
| 77 | R-1 | 3 | 3 | 1,3,5- | H | $CH_3$ | H | $L_1$ | H | H | H |
| 78 | R-1 | 3 | 3 | 1,3,5- | H | $CH_3$ | H | H | $L_1$ | H | H |
| 79 | R-1 | 3 | 3 | 1,3,5- | H | $CH_3$ | H | H | $L_3$ | H | H |
| 80 | R-1 | 3 | 3 | 1,2,4- | H | $CH_3$ | H | H | $L_1$ | H | H |

$L_1$ to $L_4$ in Tables 2-1 to 2-2 are linking groups with the azo compound unit and the high molecular weight polymer unit, and specifically have the following structures. The linking group is bonded to the azo skeleton unit at the L' position and is bonded to the high molecular weight polymer unit at the L" position. The R group contained in V shown in Table 1 is a —$CHCH_3$— portion in the following $L_1$ and is a —$(CH_2)_3$—$C(CH_3)CN$— portion in the following $L_4$, for example.

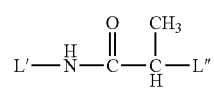
$L_1$

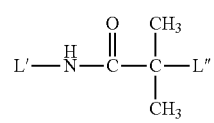
$L_2$

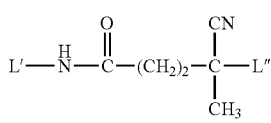
$L_3$

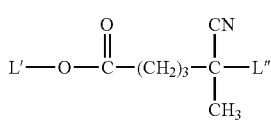
$L_4$

Comparative Example 1

Comparative azo skeleton units represented by the following Formulae (91) and (92) were manufactured in accordance with the above-described production method.

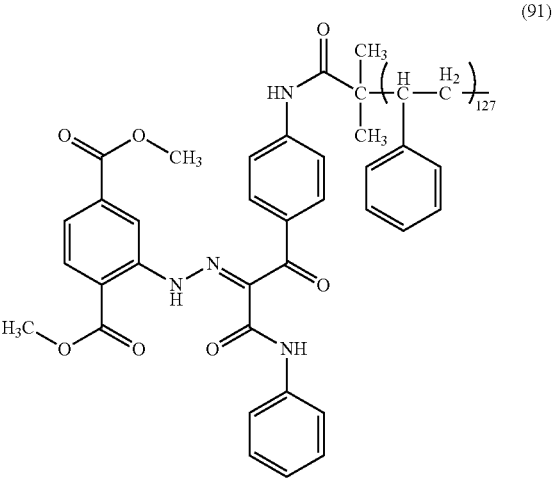

(91)

(92)

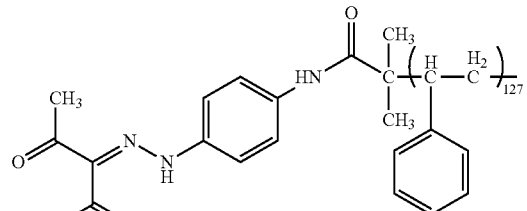

Example 2

The pigment dispersion of the invention was prepared by the following method.

Preparation Example 1 of Pigment Dispersion 18.0 parts of a pigment (C.I. Pigment Yellow 155) represented by Formula (3) above as an azo pigment, 3.6 parts of the compound (46) having the azo skeleton unit as a pigment dispersant, 180 parts of styrene as a non-water soluble solvent, and 130 parts of glass beads (1 mm in diameter) as a dispersion medium were mixed, and then the mixture was dispersed by an attritor [manufactured by NIPPON COKE & ENGINEERING. CO., LTD.] for 3 hours, followed by filtration through a mesh, thereby obtaining a pigment dispersion (DIS1).

Preparation Example 2 of Pigment Dispersion

Pigment dispersions (DIS2) to (DIS65) were obtained by performing the same operation, except changing the compound (46) having the azo skeleton unit in Preparation Example 1 of the pigment dispersion described above to the compounds (47) to (80), respectively.

Preparation Example 3 of Pigment Dispersion

Pigment dispersions (DIS66) and (DIS67) were obtained by performing the same operation, except changing styrene in Preparation Example 1 of the pigment dispersion described above to toluene and butyl acrylate, respectively.

Preparation Example 4 of Pigment Dispersion

Pigment dispersions (DIS68) to (DIS70) were obtained by performing the same operation, except changing the pigment represented by Formula (3) above in Preparation Example 1 of the pigment dispersion described above to pigments represented by the following Formulae (93) to (95), respectively.

(93)

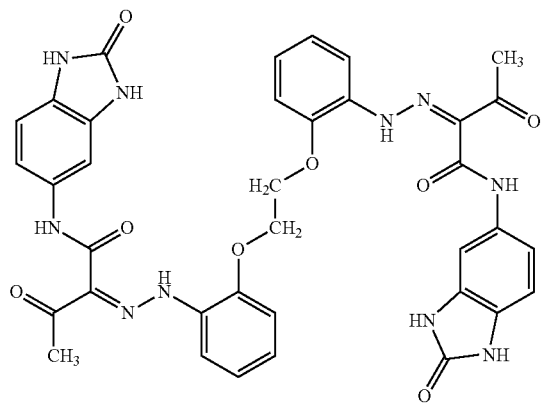

(94)

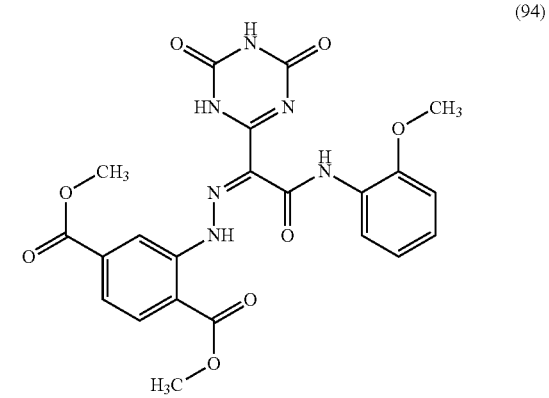

(95)

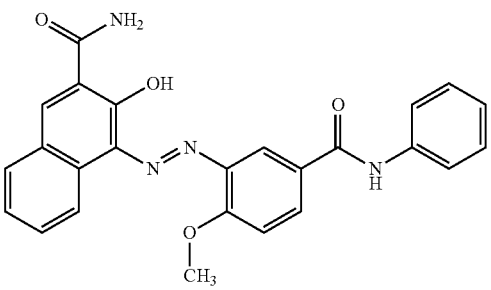

Comparative Example 2

A pigment dispersion serving as a reference value of evaluation and a comparative pigment dispersion were prepared by the following methods.

Preparation Example 1 of Reference Pigment Dispersion

A reference pigment dispersion (DIS71) was obtained by performing the same operation, except not adding the compound (46) having the azo skeleton unit in Preparation Example 1 of the pigment dispersion of Example 2 described above.

Preparation Example 2 of Reference Pigment Dispersion

Reference pigment dispersions (DIS72) and (DIS73) were obtained by performing the same operation, except not adding the compound (46) having the azo skeleton unit in Preparation Example 3 of the pigment dispersion of Example 2 described above.

Preparation Example 3 of Reference Pigment Dispersion

Reference pigment dispersions (DIS74) to (DIS76) were obtained by performing the same operation, except not adding the compound (46) having the azo skeleton unit in Preparation Example 4 of the pigment dispersion of Example 2 described above.

Preparation Example 1 of Comparative Pigment Dispersion

Comparative pigment dispersions (DIS77) to (DIS79) were obtained by performing the same operation, except changing the compound (46) having the azo skeleton unit in Preparation Example 1 of the pigment dispersion of Example 2 described above to a polymer dispersant Solsperse 24000SC (Registered Trademark) (manufactured by Lubrizol) described in PTL 2 and the comparative compounds (91) and (92), respectively.

Evaluation of Pigment Dispersion

The pigment dispersions and the comparative pigment dispersions prepared in Example 2 and Comparative Example 2 were evaluated by the following methods.

Evaluation of Pigment Dispersibility

The pigment dispersibility of the compounds having the azo skeleton unit of the invention were evaluated by performing a gloss test of coating films of the pigment dispersions. More specifically, the pigment dispersion was dipped out with a syringe, placed in the shape of a straight line in the upper portion of a super art paper [SA Kanefuji, 180 kg, 80×160, manufactured by Oji Paper Co., Ltd.], uniformly coated onto an art paper using a wire bar (#10), and then the gloss (Reflection angle: 60°) after drying was measured with a gloss meter Gloss Meter VG2000 [manufactured by NIPPON DENSHOKU INDUSTRIES CO., LTD.]. Due to the fact that when the pigment more finely dispersed, the smoothness of the coating films improves, the gloss improvement rate of the coating films of the pigment dispersions (DIS1) to (DIS70) and (DIS77) to (DIS79) was calculated based on the gloss of the coating films of the pigment dispersions (DIS71) to (DIS76) in which a pigment dispersant was not added as a reference value, and then calculated according to the following criteria.

A: Gloss improvement rate of 20% higher

B: Gloss improvement rate of 10% or higher and lower than 20%

C: Gloss improvement rate of 1% or higher and lower than 10%

D: Gloss improvement rate of lower than 1% or gloss reduction

When the gloss improvement rate was 10% or higher, it was judged that the pigment dispersibility was good.

The evaluation results of the pigment dispersions are shown in Table 3.

TABLE 3

Pigment dispersions having azo compound of invention and evaluation results of gloss

| Pigment dispersion | Azo compound | Organic solvent | Pigment | Gloss |
|---|---|---|---|---|
| DIS1 | 46 | Styrene | Formula (3) | A |
| DIS2 | 16 | Styrene | Formula (3) | A |
| DIS3 | 17 | Styrene | Formula (3) | B |
| DIS4 | 18 | Styrene | Formula (3) | A |
| DIS5 | 19 | Styrene | Formula (3) | A |
| DIS6 | 20 | Styrene | Formula (3) | A |
| DIS7 | 21 | Styrene | Formula (3) | A |
| DIS8 | 22 | Styrene | Formula (3) | A |
| DIS9 | 23 | Styrene | Formula (3) | B |
| DIS10 | 24 | Styrene | Formula (3) | A |
| DIS11 | 25 | Styrene | Formula (3) | A |
| DIS12 | 26 | Styrene | Formula (3) | A |
| DIS13 | 27 | Styrene | Formula (3) | A |
| DIS14 | 28 | Styrene | Formula (3) | A |
| DIS15 | 29 | Styrene | Formula (3) | A |
| DIS16 | 30 | Styrene | Formula (3) | A |
| DIS17 | 31 | Styrene | Formula (3) | A |
| DIS18 | 32 | Styrene | Formula (3) | A |
| DIS19 | 33 | Styrene | Formula (3) | B |
| DIS20 | 34 | Styrene | Formula (3) | A |
| DIS21 | 35 | Styrene | Formula (3) | B |
| DIS22 | 36 | Styrene | Formula (3) | A |
| DIS23 | 37 | Styrene | Formula (3) | A |
| DIS24 | 38 | Styrene | Formula (3) | A |
| DIS25 | 39 | Styrene | Formula (3) | A |
| DIS26 | 40 | Styrene | Formula (3) | A |
| DIS27 | 41 | Styrene | Formula (3) | A |
| DIS28 | 42 | Styrene | Formula (3) | A |
| DIS29 | 43 | Styrene | Formula (3) | A |
| DIS30 | 44 | Styrene | Formula (3) | A |
| DIS31 | 45 | Styrene | Formula (3) | A |
| DIS32 | 47 | Styrene | Formula (3) | A |
| DIS33 | 48 | Styrene | Formula (3) | A |
| DIS34 | 49 | Styrene | Formula (3) | A |
| DIS35 | 50 | Styrene | Formula (3) | A |
| DIS36 | 51 | Styrene | Formula (3) | A |
| DIS37 | 52 | Styrene | Formula (3) | A |
| DIS38 | 53 | Styrene | Formula (3) | A |
| DIS39 | 54 | Styrene | Formula (3) | A |
| DIS40 | 55 | Styrene | Formula (3) | A |
| DIS41 | 56 | Styrene | Formula (3) | A |
| DIS42 | 57 | Styrene | Formula (3) | A |
| DIS43 | 58 | Styrene | Formula (3) | A |
| DIS44 | 59 | Styrene | Formula (3) | A |
| DIS45 | 60 | Styrene | Formula (3) | A |
| DIS46 | 61 | Styrene | Formula (3) | B |
| DIS47 | 62 | Styrene | Formula (3) | A |
| DIS48 | 63 | Styrene | Formula (3) | B |
| DIS49 | 64 | Styrene | Formula (3) | A |
| DIS50 | 65 | Styrene | Formula (3) | A |
| DIS51 | 66 | Styrene | Formula (3) | B |
| DIS52 | 67 | Styrene | Formula (3) | B |
| DIS53 | 68 | Styrene | Formula (3) | B |
| DIS54 | 69 | Styrene | Formula (3) | A |
| DIS55 | 70 | Styrene | Formula (3) | A |
| DIS56 | 71 | Styrene | Formula (3) | A |
| DIS57 | 72 | Styrene | Formula (3) | B |
| DIS58 | 73 | Styrene | Formula (3) | A |
| DIS59 | 74 | Styrene | Formula (3) | B |
| DIS60 | 75 | Styrene | Formula (3) | B |
| DIS61 | 76 | Styrene | Formula (3) | A |
| DIS62 | 77 | Styrene | Formula (3) | A |
| DIS63 | 78 | Styrene | Formula (3) | A |
| DIS64 | 79 | Styrene | Formula (3) | A |
| DIS65 | 80 | Styrene | Formula (3) | A |
| DIS66 | 46 | Toluene | Formula (3) | A |
| DIS67 | 46 | Butyl acrylate | Formula (3) | A |
| DIS68 | 46 | Styrene | Formula (93) | A |
| DIS69 | 46 | Styrene | Formula (94) | A |
| DIS70 | 46 | Styrene | Formula (95) | A |
| DIS71 | None | Styrene | Formula (3) | — |
| DIS72 | None | Toluene | Formula (3) | — |
| DIS73 | None | Butyl acrylate | Formula (3) | — |
| DIS74 | None | Styrene | Formula (93) | — |
| DIS75 | None | Styrene | Formula (94) | — |
| DIS76 | None | Styrene | Formula (95) | — |
| DIS77 | Solsperse 24000SC | Styrene | Formula (3) | D |
| DIS78 | 91 | Styrene | Formula (3) | D |
| DIS79 | 92 | Styrene | Formula (3) | D |

In Table 3, "—" represents a reference value of evaluation.

It was confirmed from Table 3 that since the azo compound of the invention provides an azo pigment dispersion with good dispersibility, the azo compound of the invention is useful as an azo pigment dispersant.

Preparation Example 4 of Pigment Dispersion 42.0 parts of the pigment represented by Formula (3) above as an azo pigment and 8.4 parts of the azo compound (46) as a pigment dispersant were dry-mixed by a hybridization system NHS-0 [manufactured by Nara Machinery Co., Ltd.], thereby obtaining a pigment composition.

18.0 parts of the obtained pigment composition was mixed with 180 parts of styrene and then dispersed by a paint shaker [manufactured by Toyo Seiki Seisakusho, LTD.] for 1 hour, followed by filtration through a mesh, thereby obtaining a pigment dispersion.

The obtained pigment dispersion was subjected to the evaluation of pigment dispersibility described above. Then, it was confirmed that good pigment dispersibility is similarly achieved.

Example 3

Manufacturing Example 1 of Yellow Toner

Preparation of Aqueous Medium 710 parts of ion exchange water and 450 parts of an aqueous 0.1 mol/L-$Na_3PO_4$ solution were added into a 2 L four-necked flask having a high-speed stirring apparatus T.K. homomixer [manufactured by PRIMIX Corporation], stirred at a number of rotations of 12000 rpm, and then warmed to 60° C. 68 parts of an aqueous 1.0 mol/L-$CaCl_2$ solution was gradually added thereto, thereby preparing an aqueous medium containing a minute poor water-soluble dispersion stabilizer $Ca_3(PO_4)_2$.

Suspension Polymerization Process

| | |
|---|---|
| Pigment dispersion (DIS1) above | 132.0 parts |
| Styrene | 46.0 parts |
| n-butyl acrylate | 34.0 parts |
| Polar resin [Saturated polyester resin (terephthalic acid-propylene oxide modified bisphenol A, Acid value 15 mgKOH/g, Peak molecular weight 6000)] | 10.0 parts |
| Ester wax (Maximum endothermic peak in DSC measurement of 70° C., Mn of 704) | 25.0 parts |
| Salicylic acid aluminum compound (manufactured by Orient Chemical Industries Co., Ltd., Product name: BONTRON E-108) | 2.0 parts |
| Divinylbenzene monomer | 0.1 part |

The composition was warmed to 60° C., and then stirred at 5000 rpm using a high-speed stirring apparatus T.K. homomixer [manufactured by PRIMIX Corporation] at 5000 rpm and uniformly dissolved and dispersed. 10.0 parts of 2,2'-azobis(2,4-dimethylvaleronitrile) which is a polymerization initiator was added thereto, the mixture was put in the above-described aqueous medium, and then granulation was performed for 15 minutes while maintaining the number of rotations of 12000 rpm. Thereafter, the stirrer was changed to a propeller stirring blade from the high-speed stirrer, polymerization was continued at a liquid temperature of 60° C. for 5 hours, the liquid temperature was increased to 80° C., and then the polymerization was continued for 8 hours. After the end of the polymerization reaction, a residual monomer was distilled off at 80° C. under reduced pressure, and then the resultant substance was cooled to 30° C., thereby obtaining a polymer fine particle dispersion liquid.

Washing Process and Drying Process

Next, the polymer fine particle dispersion liquid was transferred to a washing vessel, diluted hydrochloric acid was added under stirring, the mixture was stirred at a pH of 1.5 for 2 hours, a compound of phosphoric acid and calcium containing $Ca_3(PO_4)_2$ was dissolved, and then the solution was subjected to solid-liquid separation with a filtering unit, thereby obtaining polymer fine particles. The polymer fine particles were put in water and stirred to form a dispersion liquid again, and thereafter the dispersion liquid was subjected to solid-liquid separation with a filtering unit. The redispersion of the polymer fine particles in water and the solid-liquid separation were repeatedly until the compound of phosphoric acid and calcium containing $Ca_3(PO_4)_2$ was sufficiently removed. Thereafter, the polymer fine particles in which the solid-liquid separation was finally achieved were sufficiently dried with a drier, thereby obtaining yellow toner particles.

1.0 part (Number average diameter of primary particles of 7 nm) of hydrophobic silica fine powder which was surface treated with hexamethyldisilazane, 0.15 part (Number average diameter of primary particles of 45 nm) of rutile-type titanium dioxide fine powder, and 0.5 part (Number average diameter of primary particles of 200 nm) of rutile-type titanium dioxide fine powder were dry-mixed with 100 parts of the obtained yellow toner particles for 5 minutes by a Henschel mixer [manufactured by NIPPON COKE & ENGINEERING. CO., LTD.], thereby obtaining a yellow toner (TNR1).

Manufacturing Example 2 of Yellow Toner

Yellow toners (TNR2) to (TNR69) of the invention were obtained in the same manner as in Manufacturing Example 1 of yellow toner, except changing the pigment dispersion (DIS1) to the pigment dispersions (DIS2) to (DIS69), respectively.

Manufacturing Example 1 of Reference Yellow Toner

Reference yellow toners (TNR70) to (TNR74) were obtained in the same manner as in Manufacturing Example 1 of yellow toner, except changing the pigment dispersion (DIS1) to the pigment dispersions (DIS71) to (DIS75), respectively. Manufacturing Example 1 of comparative yellow toner Comparative yellow toners (TNR75) to (TNR77) were obtained in the same manner as in Manufacturing Example 1 of yellow toner, except changing the pigment dispersion (DIS1) to the comparative pigment dispersions (DIS77) to (DIS79), respectively.

Manufacturing Example 3 of Yellow Toner

Preparation of Pigment Dispersion

| Ethyl acetate | 180.0 parts |
|---|---|
| Colorant of Formula (3) above | 30.0 parts |
| Azo compound (46) | 3.0 parts |

The materials above were dispersed by an attritor [manufactured by NIPPON COKE & ENGINEERING. CO., LTD.] for 3 hours, thereby preparing a pigment dispersion (DIS80).
Mixing process

| Pigment dispersion (DIS80) | 96.0 parts |
|---|---|
| Polar resin [saturated polyester resin (Polycondensate of propylene oxide modified bisphenol A and phthalic acid, Tg of 75.9° C., Mw of 11000, Mn of 4200, Acid value of 11)] | 85.0 parts |
| Hydrocarbon wax (Fischer Tropsch wax, Maximum endothermic peak in DSC measurement of 80° C., Mw of 750) | 9.0 parts |
| Salicylic acid aluminum compound [Product Name: BONTRON E-108, manufactured by Orient Chemical Industries Co., Ltd.] | 2.0 parts |
| Ethyl acetate (solvent) | 10.0 parts |

By dispersing the composition above in a ball mill for 24 hours, 200 parts of a toner composition mixed liquid was obtained.
Dispersion Suspension Process

| Calcium carbonate (covered with an acrylic acid copolymer) | 20.0 parts |
|---|---|
| Carboxymethyl cellulose [Product Name: CELLOGEN BS-H, manufactured by Dai-Ichi Kogyo Seiyaku Co., Ltd.] | 0.5 part |
| Ion exchange water | 99.5 parts |

By dispersing the composition above in a ball mill for 24 hours, carboxymethyl cellulose was dissolved, thereby obtaining an aqueous medium. 1200 parts of the aqueous medium was put in a high-speed stirring apparatus T.K. homomixer [manufactured by PRIMIX Corporation], 1000 parts of the toner composition mixed liquid was put therein under stirring with a peripheral velocity of a rotating blade of 20 m/sec, and then the mixture was stirred for 1 minute while constantly maintaining 25° C., thereby obtaining a suspension liquid.
Solvent Removal Process The gaseous phase on the suspension liquid surface was forcibly renewed using a blower at a liquid temperature constantly maintained at 40° C. while stirring 2200 parts of the suspension liquid obtained in the dispersion suspension process at a peripheral velocity of 45 m/min by a full zone blade [manufactured by KOBELCO ECO-SOLUTIONS Co., Ltd.], and then the removal of the solvent was initiated. In this case, 75 parts of ammonia water diluted to 1% was added as an ionic substance after 15 minutes passed after the solvent removal was initiated. Then, after 1 hour passed after the solvent removal was initiated, 25 parts of the ammonia water was added. Then, after 2 hours passed after the solvent removal was initiated, 25 parts of the ammonia water was added. Finally, after 3 hours passed after the solvent removal was initiated, 25 parts of the ammonia water was added, so that the total addition amount was 150 parts. The liquid was held for 17 hours from the initiation of the solvent removal while maintaining the liquid temperature at 40° C., thereby obtaining a toner dispersion liquid in which the solvent (ethyl acetate) was removed from the suspended particles.
Washing and Dehydrating Process 80 parts of 10 mol/l hydrochloric acid was added to 300 parts of the toner dispersion liquid obtained in the solvent removal process, neutralization treatment was performed with an aqueous 0.1 mol/l sodium hydroxide solution, and then washing with ion exchange water by suction filtration was repeated 4 times, thereby obtaining a toner cake. The obtained toner cake was dried with a vacuum dryer, and then sieved through a sieve with an opening of 45 μm, thereby obtaining yellow toner particles. The subsequent operation was performed in the same manner as in Manufacturing Example 1 of yellow toner described above, thereby obtaining a yellow toner (TNR78).

Manufacturing Example 4 of Yellow Toner

Yellow toners (TNR79) to (TNR142) of the invention were obtained in the same manner as in Manufacturing Example 3 of yellow toner (TNR78) described above, except changing the azo compound (46) to the azo compounds (16) to (45) and (47) to (80), respectively.

Manufacturing Example 5 of Yellow Toner

Yellow toners (TNR143) and (TNR144) of the invention were obtained in the same manner as in Manufacturing Example 3 of yellow toner described above, except changing the colorant of Formula (3) above to the pigment represented by Formula (93) or (94).

Manufacturing Example 2 of Reference Yellow Toner

A reference yellow toner (TNR145) was obtained in the same manner as in Manufacturing Example 3 of yellow toner (TNR78) described above, except not adding the azo compound (46).

Manufacturing Example 3 of Reference Yellow Toner

Reference yellow toners (TNR146) and (TNR147) were obtained in the same manner as in Manufacturing Example 3 of yellow toner described above, except not adding the compound (46) having the azo skeleton unit and changing the colorant of Formula (3) above to the pigment represented by Formula (93) or (94).

Manufacturing Example 2 of Comparative Yellow Toner

Comparative yellow toners (TNR148) to (TNR150) were obtained in the same manner as in Manufacturing Example 4 of yellow toner, except changing the compound (36) having the azo skeleton unit to a polymer dispersant Solsperse 24000SC (Registered Trademark) (manufactured by Lubrizol) described in PTL 2 and the comparative compounds (91) and (92).

Evaluation Example of Color Tone of Yellow Toner

With respect to the yellow toners (TNR1) to (TNR150), 95 parts of ferrite carrier coated with acrylic resin was mixed with 5 parts of each yellow toner to be used as a developer. Image output was performed under an environment of Temperature of 25° C./Humidity 60% RH using a modified machine of a color copier CLC-1100 [manufactured by CANON KABUSHIKI KAISHA] in which a fixing oil application mechanism was removed. Then, with respect to the images, L* and C* in the L*a*b* color system specified by CIE (International Commission on Illumination) were measured under the conditions of a light source: D50 and a visual field: 2° using a reflection concentration meter Spectrolino (manufactured by GretagMacbeth). The color tone of the toners was evaluated based on the improvement rate of C* at L*=95.5.

The improvement rate of C* of the images of the yellow toners (TNR1) to (TNR69) and the comparative yellow toners (TNR75) to (TNR77) was based on the C* of the images of the reference yellow toners (TNR70) to (TNR74) as a reference value.

The improvement rate of C* of the images of the yellow toners (TNR78) to (TNR144) and the comparative yellow toners (TNR148) to (TNR150) was based on the C* of the images of the reference yellow toners (TNR145) to (TNR147) as a reference value.

The evaluation criteria are as follows.
A: Improvement rate of 5% or higher
B: Improvement rate of 1% or higher and lower than 5%
C: Improvement rate of 0% or higher and lower than 1%
D: Reduction in C*

When the improvement rate of C* is 1% or higher, it was judged that the color tone is good.

The yellow toner type and the color tone evaluation results of the yellow toners were shown in Table 4 (Suspension polymerization method) and Table 5 (Suspension granulation method).

TABLE 4

Evaluation results of toners containing azo compound of invention and comparative toners (Suspension polymerization method)

| Yellow toner | Pigment dispersion | Pigment | Chromaticness |
|---|---|---|---|
| TNR1 | DIS1 | Formula (3) | A |
| TNR2 | DIS2 | Formula (3) | A |
| TNR3 | DIS3 | Formula (3) | B |
| TNR4 | DIS4 | Formula (3) | A |
| TNR5 | DIS5 | Formula (3) | A |
| TNR6 | DIS6 | Formula (3) | A |
| TNR7 | DIS7 | Formula (3) | A |
| TNR8 | DIS8 | Formula (3) | A |
| TNR9 | DIS9 | Formula (3) | B |
| TNR10 | DIS10 | Formula (3) | A |
| TNR11 | DIS11 | Formula (3) | A |
| TNR12 | DIS12 | Formula (3) | A |
| TNR13 | DIS13 | Formula (3) | A |
| TNR14 | DIS14 | Formula (3) | A |
| TNR15 | DIS15 | Formula (3) | A |
| TNR16 | DIS16 | Formula (3) | A |
| TNR17 | DIS17 | Formula (3) | A |
| TNR18 | DIS18 | Formula (3) | A |
| TNR19 | DIS19 | Formula (3) | B |
| TNR20 | DIS20 | Formula (3) | A |
| TNR21 | DIS21 | Formula (3) | B |
| TNR22 | DIS22 | Formula (3) | A |
| TNR23 | DIS23 | Formula (3) | A |
| TNR24 | DIS24 | Formula (3) | A |
| TNR25 | DIS25 | Formula (3) | A |
| TNR26 | DIS26 | Formula (3) | A |
| TNR27 | DIS27 | Formula (3) | A |
| TNR28 | DIS28 | Formula (3) | A |
| TNR29 | DIS29 | Formula (3) | A |
| TNR30 | DIS30 | Formula (3) | A |
| TNR31 | DIS31 | Formula (3) | A |
| TNR32 | DIS32 | Formula (3) | A |
| TNR33 | DIS33 | Formula (3) | A |
| TNR34 | DIS34 | Formula (3) | A |
| TNR35 | DIS35 | Formula (3) | A |
| TNR36 | DIS36 | Formula (3) | A |
| TNR37 | DIS37 | Formula (3) | A |
| TNR38 | DIS38 | Formula (3) | A |
| TNR39 | DIS39 | Formula (3) | A |
| TNR40 | DIS40 | Formula (3) | A |
| TNR41 | DIS41 | Formula (3) | A |
| TNR42 | DIS42 | Formula (3) | A |
| TNR43 | DIS43 | Formula (3) | A |
| TNR44 | DIS44 | Formula (3) | A |
| TNR45 | DIS45 | Formula (3) | A |
| TNR46 | DIS46 | Formula (3) | B |
| TNR47 | DIS47 | Formula (3) | A |
| TNR48 | DIS48 | Formula (3) | B |
| TNR49 | DIS49 | Formula (3) | A |
| TNR50 | DIS50 | Formula (3) | A |
| TNR51 | DIS51 | Formula (3) | B |
| TNR52 | DIS52 | Formula (3) | B |
| TNR53 | DIS53 | Formula (3) | B |
| TNR54 | DIS54 | Formula (3) | A |
| TNR55 | DIS55 | Formula (3) | A |
| TNR56 | DIS56 | Formula (3) | B |
| TNR57 | DIS57 | Formula (3) | A |
| TNR58 | DIS58 | Formula (3) | A |
| TNR59 | DIS59 | Formula (3) | B |
| TNR60 | DIS60 | Formula (3) | B |
| TNR61 | DIS61 | Formula (3) | A |
| TNR62 | DIS62 | Formula (3) | A |
| TNR63 | DIS63 | Formula (3) | A |
| TNR64 | DIS64 | Formula (3) | A |

TABLE 4-continued

Evaluation results of toners containing azo compound of invention and comparative toners (Suspension polymerization method)

| Yellow toner | Pigment dispersion | Pigment | Chromaticness |
|---|---|---|---|
| TNR65 | DIS65 | Formula (3) | A |
| TNR66 | DIS66 | Formula (3) | A |
| TNR67 | DIS67 | Formula (3) | A |
| TNR68 | DIS68 | Formula (93) | A |
| TNR69 | DIS69 | Formula (94) | A |
| TNR70 | DIS71 | Formula (3) | — |
| TNR71 | DIS72 | Formula (3) | — |
| TNR72 | DIS73 | Formula (3) | — |
| TNR73 | DIS74 | Formula (93) | — |
| TNR74 | DIS75 | Formula (94) | — |
| TNR75 | DIS77 | Formula (3) | D |
| TNR76 | DIS78 | Formula (3) | D |
| TNR77 | DIS79 | Formula (3) | D |

TABLE 5

Evaluation results of toners containing azo compound of invention and comparative toners (Suspension granulation method)

| Yellow toner | Azo compound | Pigment | Chromaticness |
|---|---|---|---|
| TNR78 | 46 | Formula (3) | A |
| TNR79 | 16 | Formula (3) | A |
| TNR80 | 17 | Formula (3) | B |
| TNR81 | 18 | Formula (3) | A |
| TNR82 | 19 | Formula (3) | A |
| TNR83 | 20 | Formula (3) | A |
| TNR84 | 21 | Formula (3) | A |
| TNR85 | 22 | Formula (3) | A |
| TNR86 | 23 | Formula (3) | B |
| TNR87 | 24 | Formula (3) | A |
| TNR88 | 25 | Formula (3) | A |
| TNR89 | 26 | Formula (3) | A |
| TNR90 | 27 | Formula (3) | A |
| TNR91 | 28 | Formula (3) | A |
| TNR92 | 29 | Formula (3) | A |
| TNR93 | 30 | Formula (3) | A |
| TNR94 | 31 | Formula (3) | A |
| TNR95 | 32 | Formula (3) | A |
| TNR96 | 33 | Formula (3) | B |
| TNR97 | 34 | Formula (3) | A |
| TNR98 | 35 | Formula (3) | B |
| TNR99 | 36 | Formula (3) | A |
| TNR100 | 37 | Formula (3) | A |
| TNR101 | 38 | Formula (3) | A |
| TNR102 | 39 | Formula (3) | A |
| TNR103 | 40 | Formula (3) | A |
| TNR104 | 41 | Formula (3) | A |
| TNR105 | 42 | Formula (3) | A |
| TNR106 | 43 | Formula (3) | A |
| TNR107 | 44 | Formula (3) | A |
| TNR108 | 45 | Formula (3) | A |
| TNR109 | 47 | Formula (3) | A |
| TNR110 | 48 | Formula (3) | A |
| TNR111 | 49 | Formula (3) | A |
| TNR112 | 50 | Formula (3) | A |
| TNR113 | 51 | Formula (3) | A |
| TNR114 | 52 | Formula (3) | A |
| TNR115 | 53 | Formula (3) | A |
| TNR116 | 54 | Formula (3) | A |
| TNR117 | 55 | Formula (3) | A |
| TNR118 | 56 | Formula (3) | A |
| TNR119 | 57 | Formula (3) | A |
| TNR120 | 58 | Formula (3) | A |
| TNR121 | 59 | Formula (3) | A |
| TNR122 | 60 | Formula (3) | A |
| TNR123 | 61 | Formula (3) | B |
| TNR124 | 62 | Formula (3) | A |
| TNR125 | 63 | Formula (3) | B |
| TNR126 | 64 | Formula (3) | A |
| TNR127 | 65 | Formula (3) | A |
| TNR128 | 66 | Formula (3) | B |
| TNR129 | 67 | Formula (3) | B |
| TNR130 | 68 | Formula (3) | B |
| TNR131 | 69 | Formula (3) | B |
| TNR132 | 70 | Formula (3) | A |
| TNR133 | 71 | Formula (3) | A |
| TNR134 | 72 | Formula (3) | B |
| TNR135 | 73 | Formula (3) | A |
| TNR136 | 74 | Formula (3) | B |
| TNR137 | 75 | Formula (3) | B |
| TNR138 | 76 | Formula (3) | A |
| TNR139 | 77 | Formula (3) | A |
| TNR140 | 78 | Formula (3) | A |
| TNR141 | 79 | Formula (3) | A |
| TNR142 | 80 | Formula (3) | A |
| TNR143 | 46 | Formula (93) | A |
| TNR144 | 46 | Formula (94) | A |
| TNR145 | None | Formula (3) | — |
| TNR146 | None | Formula (93) | — |
| TNR147 | None | Formula (94) | — |
| TNR148 | Solsperse 24000SC | Formula (3) | D |
| TNR149 | 91 | Formula (3) | D |
| TNR150 | 92 | Formula (3) | D |

"—" in Tables 4 and 5 represents a reference value of evaluation.)

It was found from Tables 4 and 5 that the toners containing the azo compound of the invention as a pigment dispersant have high chromaticness and express a favorable color tone. This confirmed that the azo compound of the invention is useful as a pigment dispersant for toner.

The azo compound of the invention is particularly suitably used as a dispersant for dispersing an azo pigment in a non-water soluble solvent. The azo compound of the invention can be used not only as a pigment dispersant but as a colorant of electrophotographic toner, inkjet ink, thermal transfer recording sheets, and color filters and a dye for optical recording media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-043467, filed Feb. 29, 2012, which is hereby incorporated by reference herein in its entirety.

The invention claimed is:

1. An azo compound comprising:
   a partial structure represented by the following Formula (A) or Formula (B) and
   a polymer unit,
   wherein
   the polymer unit bonds to the partial structure and has a repeating unit represented by Formula (2) and has a number average molecular weight of 500 or more and 200000 or less,

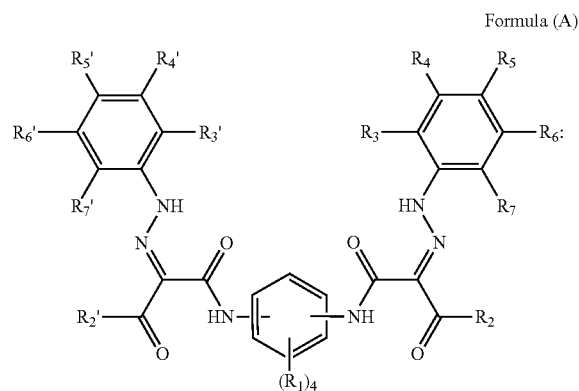

Formula (A)

wherein, in Formula (A),
   $R_1$ each independently represents a hydrogen atom, a halogen atom, an alkyl group, an alkoxy group, a trifluoromethyl group, or a cyano group,
   $R_2$ and $R_2'$ represents an alkyl group having 1 to 6 carbon atoms, a phenyl group, an alkoxy group having 1 to 6 carbon atoms, or an amino group,
   $R_3$ to $R_7$, and $R_3'$ to $R_7'$ each independently represents a hydrogen atom, a halogen atom, an alkyl group, an alkoxy group, a trifluoromethyl group, a cyano group, or a linking group, the linking group is bonded to the polymer, and at least one of $R_3$ to $R_7$ and at least one of $R_3'$ to $R_7'$ are is the linking group;

Formula (B)

wherein, in Formula (B),
   $R_1$ each independently represents a hydrogen atom, a halogen atom, an alkyl group, an alkoxy group, a trifluoromethyl group, or a cyano group,
   $R_2$, $R_2'$, and $R_2''$, represent an alkyl group having 1 to 6 carbon atoms a phenyl group, an alkoxy group having 1 to 6 carbon atoms, or an amino group,
   $R_3$ to $R_7$, $R_3'$ to $R_7'$, and $R_3''$ to $R_7''$ each independently represents a hydrogen atom, a halogen atom, an alkyl group, an alkoxy group, a trifluoromethyl group, a cyano group, or a linking group, the linking group is bonded to the polymer, and at least one of $R_3$ to $R_7$, at least one of $R_3'$ to $R_7'$, and at least one of $R_3''$ to $R_7''$ are the linking group;

Formula (2)

In Formula (2), $R_8$ represents a hydrogen atom or an alkyl group having 1 to 6 carbon atoms and $R_9$ represents a phenyl group, a carboxyl group, a carboxylic acid ester group, or a carboxylic acid amide group.

2. The azo compound according to claim 1, wherein $R_2$ is a methyl group.

3. The azo compound according to claim 1, wherein $R_1$ is a hydrogen atom.

4. The azo compound according to claim 1, wherein the linking group has an amide bond or an ester bond.

5. A pigment dispersant, comprising the azo compound according to claim 1.

6. A pigment composition, comprising the pigment dispersant of claim 5 and an azo pigment.

7. The pigment composition according to claim 6, wherein the azo pigment is an acetanilide pigment.

8. The pigment composition according to claim 6, wherein the azo pigment is an azo pigment represented by the following Formula (3)

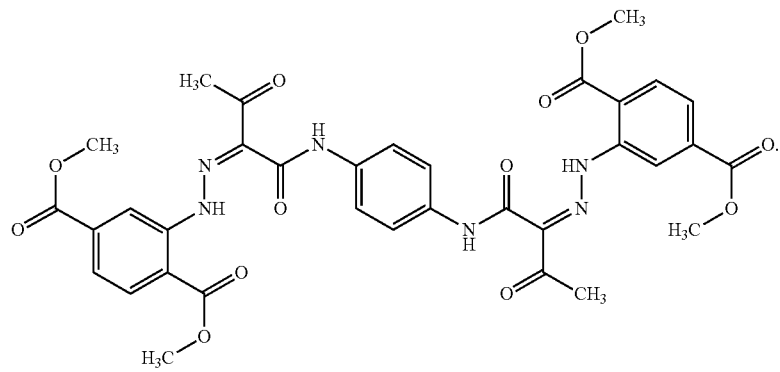

[Chem. 3]

9. A pigment dispersion, comprising the pigment composition according to claim 6 and a non-water soluble solvent.

10. The pigment dispersion according to claim 9, wherein the non-water soluble solvent is a styrene monomer.

11. A toner, comprising toner particles each of which contains a binder resin, a colorant, and a wax component, wherein the colorant is the pigment composition according to claim 6.

12. The toner according to claim 11, wherein the toner particles are manufactured by a suspension polymerization method or a suspension granulation method.

\* \* \* \* \*